US012689125B2

(12) United States Patent
Zhang et al.

(10) Patent No.: US 12,689,125 B2
(45) Date of Patent: Jul. 21, 2026

(54) ANTENNA MODULE AND DISPLAY DEVICE

(71) Applicants: Beijing BOE Technology Development Co., Ltd., Beijing (CN); BOE TECHNOLOGY GROUP CO., LTD., Beijing (CN)

(72) Inventors: Yafei Zhang, Beijing (CN); Dongdong Zhang, Beijing (CN); Mengwen Jia, Beijing (CN); Xudong Zhang, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 83 days.

(21) Appl. No.: 18/665,648

(22) Filed: May 16, 2024

(65) Prior Publication Data

US 2024/0322434 A1 Sep. 26, 2024

Related U.S. Application Data

(63) Continuation of application No. PCT/CN2023/083282, filed on Mar. 23, 2023.

(51) Int. Cl.
*H01Q 9/04* (2006.01)
*H01Q 1/22* (2006.01)

(52) U.S. Cl.
CPC ............ *H01Q 9/0414* (2013.01); *H01Q 1/22* (2013.01)

(58) Field of Classification Search
CPC ........ H01Q 9/0414; H01Q 1/22; H01Q 9/045; H01Q 1/2283; H01Q 1/243
See application file for complete search history.

(56) References Cited

U.S. PATENT DOCUMENTS 4,956,643 A * 9/1990 Hahn, III ............ H04B 7/2041 342/51
6,326,863 B1 * 12/2001 Kushitani ............ H01P 1/2135 333/128

(Continued)

FOREIGN PATENT DOCUMENTS

CN 109193123 A * 1/2019 ............ H01Q 21/00
CN 110336112 A 10/2019

(Continued)

OTHER PUBLICATIONS

Office Action dated Nov. 13, 2025, issued in counterpart CN Application No. 202380008430.5, with English translation. (16 pages).

*Primary Examiner* — Dameon E Levi
*Assistant Examiner* — Jordan E. DeWitt
(74) *Attorney, Agent, or Firm* — WHDA, LLP

(57) ABSTRACT

An is applied in the display device and includes a first antenna, a first transmission structure, a second antenna, a second transmission structure, and a radio frequency unit; the first antenna is electrically connected to the radio frequency unit at least through the first transmission structure, and the second antenna is electrically connected to the radio frequency unit through the second transmission structure; when the antenna module is applied in a display device, the first antenna is located on the display surface side of the display device, and the second antenna is located on a side of the display device away from the display surface side.

19 Claims, 14 Drawing Sheets

(56) References Cited

U.S. PATENT DOCUMENTS

| | | | | |
|---|---|---|---|---|
| 9,893,752 | B2 * | 2/2018 | Domino | H03F 3/19 |
| 11,245,432 | B2 * | 2/2022 | Farahvash | H03H 7/38 |
| 11,496,162 | B2 * | 11/2022 | Mori | H03F 1/56 |
| 2004/0041660 | A1 * | 3/2004 | Kawahara | H01P 1/2135 333/133 |
| 2004/0066256 | A1 * | 4/2004 | Maekawa | H01P 1/2135 333/204 |
| 2006/0279374 | A1 * | 12/2006 | Wu | H01P 5/10 333/26 |
| 2015/0244062 | A1 * | 8/2015 | Chou | H04B 5/43 343/702 |
| 2016/0381649 | A1 * | 12/2016 | Anthony | H04L 5/001 455/127.2 |
| 2017/0179567 | A1 * | 6/2017 | Zou | H01Q 1/364 |
| 2019/0027808 | A1 * | 1/2019 | Mow | H04R 5/04 |
| 2019/0052292 | A1 * | 2/2019 | Seo | H01Q 9/0421 |
| 2019/0221921 | A1 * | 7/2019 | Resnati | H04B 1/0057 |
| 2019/0319341 | A1 * | 10/2019 | Park | H01Q 21/065 |
| 2019/0356344 | A1 * | 11/2019 | Takada | H04B 1/0064 |
| 2019/0386380 | A1 * | 12/2019 | Ham | H01Q 1/243 |
| 2020/0251807 | A1 * | 8/2020 | Oh | H01Q 9/0407 |
| 2021/0234259 | A1 * | 7/2021 | Son | H04B 1/40 |
| 2021/0280975 | A1 * | 9/2021 | Park | H04M 1/0266 |
| 2021/0320414 | A1 * | 10/2021 | Kim | H01Q 9/30 |
| 2022/0006180 | A1 * | 1/2022 | Oh | H01Q 1/364 |
| 2022/0094059 | A1 * | 3/2022 | Wang | H01Q 21/28 |
| 2022/0131256 | A1 * | 4/2022 | Lee | H01Q 9/0407 |
| 2022/0131279 | A1 * | 4/2022 | Kim | H01Q 21/24 |
| 2022/0158361 | A1 * | 5/2022 | Kim | H01Q 9/0407 |
| 2022/0200134 | A1 * | 6/2022 | Yoon | H01Q 9/0407 |
| 2022/0302573 | A1 * | 9/2022 | Choi | G06F 1/1626 |
| 2022/0311115 | A1 * | 9/2022 | Jia | H01P 3/08 |
| 2022/0320701 | A1 * | 10/2022 | Fang | H01P 5/028 |
| 2022/0368357 | A1 * | 11/2022 | Chen | H04L 5/1461 |
| 2023/0006349 | A1 * | 1/2023 | Lee | H01Q 21/24 |
| 2023/0099689 | A1 * | 3/2023 | Han | H01Q 1/22 361/816 |
| 2023/0209730 | A1 * | 6/2023 | Fujii | H05K 1/03 174/250 |
| 2023/0231298 | A1 * | 7/2023 | Choi | H01Q 1/243 343/702 |
| 2024/0145900 | A1 * | 5/2024 | Gu | H05K 1/189 |
| 2024/0258705 | A1 * | 8/2024 | Ding | H01Q 21/08 |
| 2024/0322434 | A1 * | 9/2024 | Zhang | H01Q 9/045 |

FOREIGN PATENT DOCUMENTS

| | | | |
|---|---|---|---|
| CN | 110998974 | A | 4/2020 |
| CN | 111542966 | A | 8/2020 |
| CN | 112490631 | A | 3/2021 |
| CN | 114566791 | A | 5/2022 |
| JP | 2022-051890 | A | 4/2022 |

* cited by examiner

ANTENNA MODULE AND DISPLAY DEVICE

CROSS-REFERENCE TO RELATED APPLICATION

The present disclosure is the bypass continuation application of PCT Application No. PCT/CN2023/083282 filed on Mar. 23, 2023, which are incorporated herein by reference in their entireties.

TECHNICAL FIELD

The present disclosure relates to the field of communication technology, in particular to an antenna module and a display device.

BACKGROUND

Antenna is one of the most important components of all communication equipment. Its quality is directly related to the communication capabilities and work efficiency of the terminal. Antennas have always been the focus and difficulty of terminal design. With the arrival of the fifth generation mobile communication technology (5G), the difficulty of antenna design has been pushed to a new level.

Firstly, 5G terminals must support multi-antenna technology to meet the requirements of the ultra-high transmission rate. In order to achieve high speeds, 5G introduces array antenna multiple-input multiple-output (Massive MIMO) technology and beamforming technology, and terminal antennas require synchronization support. Secondly, 5G terminal antennas must have a reasonable layout design and be as small as possible. However, it is not easy to install large-scale 5G antennas in a small space inside the equipment. Antennas are sensitive components, and there are strict restrictions on their placement position and placement way. If the layout design is unreasonable, it can easily lead to mutual interference with other components and cause electromagnetic compatibility (EMC) problems. In addition to the above points, there are many factors that need to be considered in terminal antenna design, such as the application of new processes and new materials, the enhancement of product durability, reliability, ease of installation, etc.

SUMMARY

The present disclosure aims to solve a technical problem in the prior art and provides an antenna module and a display device.

In a first aspect, an embodiment of the present disclosure provides an antenna module applied in a display device; wherein the antenna module includes a first antenna, a first transmission structure, a second antenna, a second transmission structure, and a radio frequency unit; the first antenna is electrically connected to the radio frequency unit at least through the first transmission structure, and the second antenna is electrically connected to the radio frequency unit through the second transmission structure; when the antenna module is applied in the display device, the first antenna is located on a display surface side of the display device, and the second antenna is located on a side of the display device away from the display surface side.

In some embodiment, the antenna module further includes a first dielectric layer and a second dielectric layer; the first transmission structure includes a first transmission line and a second transmission line; the first transmission line includes a first signal electrode, a first reference electrode and a second reference electrode; the first signal electrode is provided between the first dielectric layer and the second dielectric layer; the first reference electrode is arranged on a side of the first dielectric layer away from the first signal electrode; the second reference electrode is arranged on a side of the second dielectric layer away from the first signal electrode, the first reference electrode and the second reference electrode define the first signal electrode therebetween, and the first signal electrode is electrically connected to the radio frequency unit; the second transmission line includes a second signal electrode and a third reference electrode, one of the second signal electrode and the third reference electrode is arranged between the first dielectric layer and the second dielectric layer, and the other is arranged on a side of the first dielectric layer away from the second dielectric layer; orthographic projections of the second signal electrode and the third reference electrode on the first dielectric layer at least partially overlap; the second signal electrode is electrically connected to the first antenna; the first signal electrode is electrically connected to the second signal electrode.

In some embodiment, when the second signal electrode is arranged between the first dielectric layer and the second dielectric layer, the second signal electrode is bonded to the first antenna through a first via hole penetrating the first dielectric layer.

In some embodiment, when the third reference electrode is arranged on a side of the first dielectric layer away from the second signal electrode, the third reference electrode and the first reference electrode are integrally formed; when the third reference electrode is arranged on a side of the second dielectric layer away from the second signal electrode, the third reference electrode and the second reference electrode are integrally formed.

In some embodiment, the antenna module further includes a third transmission structure, the third transmission structure is electrically connected to the first transmission structure; the first antenna is electrically connected to the radio frequency unit through the first transmission structure and the third transmission structure.

In some embodiment, the antenna module further includes a third dielectric layer and a fourth dielectric layer; when the antenna module is applied in the display device, the third transmission structure, the third dielectric layer and the fourth dielectric layer are all arranged on the display surface side of the display device; the third transmission structure includes a third transmission line and a fourth transmission line; the third transmission line includes a third signal electrode, a fourth reference electrode and a fifth reference electrode; the third signal electrode is provided between the third dielectric layer and the fourth dielectric layer; the fourth reference electrode is arranged on a side of the third dielectric layer away from the third signal electrode; the fifth reference electrode is arranged on a side of the fourth dielectric layer away from the second signal electrode, the fourth reference electrode and the fifth reference electrode define the second signal electrode therebetween, and the third signal electrode is electrically connected to the second signal electrode; the fourth transmission line includes a fourth signal electrode and a sixth reference electrode, and the fourth signal electrode is arranged on a side of the third dielectric layer close to the fourth dielectric layer; the sixth reference electrode is arranged on a side of the third dielectric layer away from the fourth signal electrode; orthographic projections of the fourth signal electrode and the sixth reference electrode on the fourth dielectric layer at least partially overlap; the fourth signal electrode is electrically connected to the third signal electrode; the sixth reference electrode and the fourth reference electrode are electrically connected.

In some embodiment, when the second signal electrode is arranged between the first dielectric layer and the second dielectric layer, the second signal electrode is bonded to the third signal electrode through a first via hole penetrating the first dielectric layer and a second via hole penetrating the fourth dielectric layer.

In some embodiment, the fourth signal electrode is bonded to the first antenna through a third via hole penetrating the fourth dielectric layer.

In some embodiment, the antenna module further includes a fourth transmission structure, the fourth transmission structure is electrically connected to the first transmission structure; the first antenna is electrically connected to the radio frequency unit through the first transmission structure and the fourth transmission structure.

In some embodiment, the antenna module further includes a fifth dielectric layer, the fifth dielectric layer includes a first surface and a second surface arranged oppositely along a thickness direction of the fifth dielectric layer; the first antenna includes a first radiation patch arranged on the first surface of the fifth dielectric layer; the fourth transmission structure includes a fifth signal electrode and a seventh reference electrode; the fifth signal electrode is arranged on the first surface of the fifth dielectric layer, and the seventh reference electrode is arranged on the second surface of the fifth dielectric layer, and orthographic projections of the fifth signal electrode and the seventh reference electrode on the fifth dielectric layer at least partially overlap; the fifth signal electrode and the first radiation patch are electrically connected; the fifth signal electrode and the second signal electrode are electrically connected.

In some embodiment, when the second signal electrode is arranged between the first dielectric layer and the second dielectric layer, the second signal electrode is bonded to the fifth signal electrode through the first via hole penetrating the first dielectric layer.

In some embodiment, the antenna module further includes a sixth dielectric layer and a seventh dielectric layer; the second antenna includes an eighth reference electrode, a second radiation patch and a third radiation patch; the eighth reference electrode is arranged between the second dielectric layer and the sixth dielectric layer; the second radiation patch is arranged between the sixth dielectric layer and the seventh dielectric layer; the third radiation patch is arranged on a side of the seventh dielectric layer away from the second radiation patch; orthographic projections of the eighth reference electrode, the second radiation patch and the third radiation patch on the second dielectric layer at least partially overlap; the second radiation patch and the second transmission structure are electrically connected.

In some embodiment, the eighth reference electrode and the second reference electrode are integrally formed.

In some embodiment, a material of the first dielectric layer, the sixth dielectric layer and the seventh dielectric layer is a polymer liquid crystal polymer.

In some embodiment, the radio frequency unit at least includes a plurality of first multiplexers, a plurality of first radio frequency transceiver modules, a first phase adjustment module and a baseband; the second antenna is connected to the first multiplexer in a one-to-one corresponding manner; the first multiplexer is connected to the first radio frequency transceiver module in a one-to-one corresponding manner; the first radio frequency transceiver module includes a first signal amplifier located on a receiving path of the antenna module, and a second signal amplifier located on a transmitting path of the antenna module; the first signal amplifier and the second signal amplifier in one first radio frequency transceiver module are connected to different ports of the first multiplexer; the first signal amplifier and the second signal amplifier in each first radio frequency transceiver module are both electrically connected to the first phase adjustment module; the baseband is electrically connected to the first phase adjustment module.

In some embodiment, the radio frequency unit further includes a plurality of second multiplexers and a plurality of second radio frequency transceiver modules;

the first antenna is connected to the second multiplexer in a one-to-one corresponding manner; the second multiplexer is connected to the second radio frequency transceiver module in a one-to-one corresponding manner; the second radio frequency transceiver module includes a first signal amplifier located on a receiving path of the antenna module, and a second signal amplifier located on a transmitting path of the antenna module; the first signal amplifier and the second signal amplifier in one second radio frequency transceiver module are connected to different ports of the second multiplexer; the first signal amplifier and the second signal amplifier in each second radio frequency transceiver module are both electrically connected to the first phase adjustment module.

In some embodiment, the radio frequency unit further includes one second multiplexer, one second radio frequency transceiver module and a second phase adjustment module; each of the first antennas is electrically connected to the second phase adjustment module, and different first antennas are connected to different first ports of the second phase adjustment module; a second port of the second phase adjustment module is electrically connected to the second multiplexer; the second multiplexer is electrically connected to the second radio frequency transceiver module; the second radio frequency transceiver module includes a first signal amplifier located on a receiving path of the antenna module, and a second signal amplifier located on a transmitting path of the antenna module; the first signal amplifier and the second signal amplifier in the second radio frequency transceiver module are connected to different ports of the second multiplexer; the first signal amplifier and the second signal amplifier in the second radio frequency transceiver module are both connected to the first phase adjustment module.

In some embodiment, the radio frequency unit further includes one second multiplexer, one second radio frequency transceiver module and a third phase adjustment module; a first port of each first antenna is connected to a port of the second multiplexer; the first port of each first antenna is electrically connected to the third phase adjustment module, and different first antennas are connected to different ports of the third phase adjustment module; the second multiplexer is electrically connected to the second radio frequency transceiver module; the second radio frequency transceiver module includes a first signal amplifier located on a receiving path of the antenna module, and a second signal amplifier located on a transmitting path of the antenna module; the first signal amplifier and the second signal amplifier in the second radio frequency transceiver module are connected to different ports of the second multiplexer; the first signal amplifier and the second signal amplifier in the second radio frequency transceiver module are both electrically connected to the first phase adjustment module.

In a second aspect, an embodiment of the present disclosure provides a display device, including a display module and the antenna module; wherein the display module at least includes a display substrate; the second antenna is arranged on a light-emitting side of the display substrate; the radio frequency unit is arranged on a side of the display substrate away from the second antenna; the second antenna is arranged on a side of the radio frequency unit away from the display substrate.

Figure 1A:
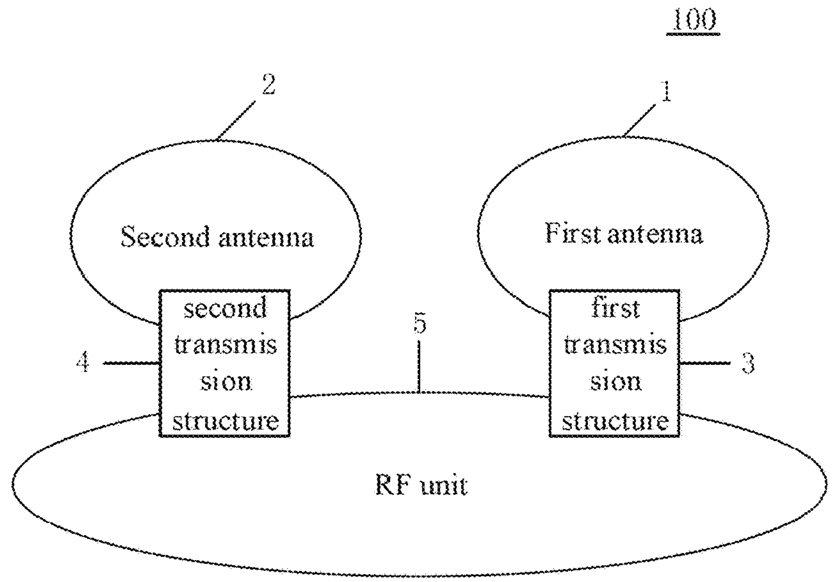
FIG. 1*a* is a schematic diagram of an antenna module provided by an embodiment of the present disclosure.

The reference numbers are as follows.

100. Antenna module; 01. First dielectric layer; 02. Second dielectric layer; 03. Third dielectric layer; 04. Fourth dielectric layer; 05. Fifth dielectric layer; 06. Sixth dielectric layer; 07. Seventh dielectric layer; 08. Eighth dielectric layer; 09. Bonding layer;

1. AoD antenna; 11. First radiation patch;

2. AiP antenna; 21. Eighth reference electrode; 22. Second radiation patch; 23. Third radiation patch; 4. Second transmission structure;

3. First transmission structure; 31. First transmission line; 32. Second transmission line; 311. First signal electrode; 312. First reference electrode; 313. Second reference electrode; 321. Second signal electrode; 322. Third reference electrodes; Via1, the first via hole; 33, the first pad;

5. Radio frequency unit; 51. First multiplexer; 52. First radio frequency transceiver module; 53. First phase adjustment module; 54. Baseband; 55. Second multiplexer; 56. Second radio frequency transceiver module; 501, first signal amplifier; 502, second signal amplifier; 57, second phase adjustment module; 58, third phase adjustment module;

6. Third transmission structure; 61. Third transmission line; 62. Fourth transmission line; 611. Third signal electrode; 612. Fourth reference electrode; 613. Fifth reference electrode; 621. Fourth signal electrode; 622. Sixth reference electrode; Via2, the second via hole; Via3, the third via hole;

7. Fourth transmission structure; 71. Fifth signal electrode; 72. Seventh reference electrode;

200. Display device; 20. Display substrate; 30. First bonding structure; 40. Polarizer; 50. Second bonding structure; 60. Cover plate.

DETAILED DESCRIPTION

In order to make the purpose, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are only some embodiments of the present disclosure, but not all embodiments. The components of the embodiments of the present disclosure generally described and illustrated in the drawings herein may be arranged and designed in a variety of different configurations. Therefore, the following detailed description of the embodiments of the disclosure provided in the appended drawings is not intended to limit the scope of the disclosure, but rather to represent selected embodiments of the disclosure. Based on the embodiments of the present disclosure, all other embodiments obtained by those skilled in the art without any creative efforts shall fall within the scope of protection of the present disclosure.

Unless otherwise defined, technical terms or scientific terms applied in this disclosure shall have the usual meaning understood by a person with ordinary skill in the art to which this disclosure belongs. "First", "second" and similar words applied in this disclosure do not indicate any order, quantity or importance, but are only used to distinguish different components. Likewise, similar words such as "a", "an" or "the" do not indicate a quantitative limitation but rather indicate the presence of at least one. Words such as "include" or "comprising" mean that the elements or things appearing before the word include the elements or things listed after the word and their equivalents, without excluding other elements or things. Words such as "connected" or "coupled" are not limited to physical or mechanical connections, but may include electrical connections, whether direct or indirect. "Up", "down", "left", "right", etc. are only used to express relative positional relationships. When the absolute position of the described object changes, the relative positional relationship may also change accordingly.

"A plurality or several" mentioned in this disclosure means two or more. "And/or" describes the relationship between related objects, indicating that there can be three relationships. For example, A and/or B can mean: A exists alone, A and B exist simultaneously, and B exists alone. The character "/" generally indicates that the related objects are in an "or" relationship.

Among related technologies, with the development of 5G, communication frequency bands will inevitably develop in the direction of millimeter waves. As for millimeter wave, its biggest advantage is that the frequency band resources are very rich. The bandwidth of millimeter wave can reach 400M or even 800M, and the wireless transmission speed can reach 10 Gbps. Millimeter waves have very strong spatial distribution capabilities due to their small antennas. The bandwidth is large, which can be 4 times that of 3.5G, and resulting in a small air interface delay, natural advantages are provided for the development of high-reliability, low-latency services. However, millimeter wave itself has advantages but also has some shortcomings, such as large transmission loss, poor coverage, and large penetration loss. During the propagation process, millimeter waves are easily blocked and difficult to penetrate. Millimeter wave itself has a relatively high frequency and the size of the device is very small, so the above problems can be reduced to a certain extent by deploying larger-scale antennas. Especially with large-scale antennas, narrow beams can be set up. Through narrow beams, the propagation loss and penetration loss caused by excessive frequency can be compensated to a certain extent, which is the characteristic of millimeter waves themselves. At present, the traditional technical solution is to package and integrate millimeter-wave antenna arrays and radio frequency ICs to prepare compact antenna-in-package (AiP antenna) modules. AiP antenna modules are highly integrated, such as integrating antennas, power amplifiers, low noise amplifiers, duplexers, filters, etc., generally in the millimeter wave frequency band, but AiP antenna modules are thicker (approximately about 3 mm). In addition, in theory, terminal can be provided with multiple AiP antenna modules, but considering the cost of AiP antenna modules and the limited accommodation space of terminal, such as motherboards, batteries, cameras, etc. occupying most of the accommodation space of terminal equipment, the space reserved for antenna modules is limited, so actual terminal (such as mobile phones) can only accommodate up to 3 AiP antenna modules, which is difficult to meet the multi-directional radiation requirements of the antenna. In addition, AiP antenna modules are also susceptible to electromagnetic interference from metal frames, motherboard battery cooling films, cameras and other modules. In addition, screens are generally impermeable (penetration loss is about 30 db), which reduces antenna performance and leads to data transmission delay.

Based on this, embodiments of the present disclosure provide an antenna module that substantially eliminates one or more of the problems caused by limitations and defects of the related technology. Specifically, the antenna module is applied in a display device; the antenna module includes a first antenna, a first transmission structure, a second antenna, a second transmission structure, and a radio frequency unit; the first antenna is electrically connected to the radio frequency unit at least through the first transmission structure, and the second antenna is electrically connected to the radio frequency unit through the second transmission structure; wherein, when the antenna module is applied in a display device, the first antenna is located on the display surface side of the display device, and the second antenna is located on a side of the antenna device away from the display device.

For example, the first antenna located on the side of the display surface of the display device can be an antenna in display (AoD antenna for short), and the second antenna located on the side of the antenna device away from the display surface can be an AiP antenna. Both AoD antennas and AiP antennas are capable of millimeter wave communications. Among them, the AoD antenna is combined with the display substrate in the display device, and the display substrate is used as the metal ground of the AoD antenna. There is no metal in other film layers in the display device except the display substrate, so the AoD antenna is subject to less electromagnetic interference.

The antenna module provided by the embodiment of the present disclosure is applied to a display device. Antennas are provided on both the light-emitting surface (that is, the display surface) and the non-light-emitting surface of the display device. An AoD antenna with stable performance is provided on the light-emitting surface, and an AoD antenna with a highly integration is provided on the non-light-emitting surface, all-round millimeter wave coverage of the display device can be achieved, which effectively achieve signal enhancement, make up for the shortcomings of the AiP antenna when a single AiP antenna module is installed, and enhance the reliability of millimeter wave communications. In addition, the AoD antenna and the AiP antenna share the same radio frequency unit, which can reduce the overall space occupied by the antenna module, reduce the difficulty of product assembly, and reduce product costs.

Figure 1B:
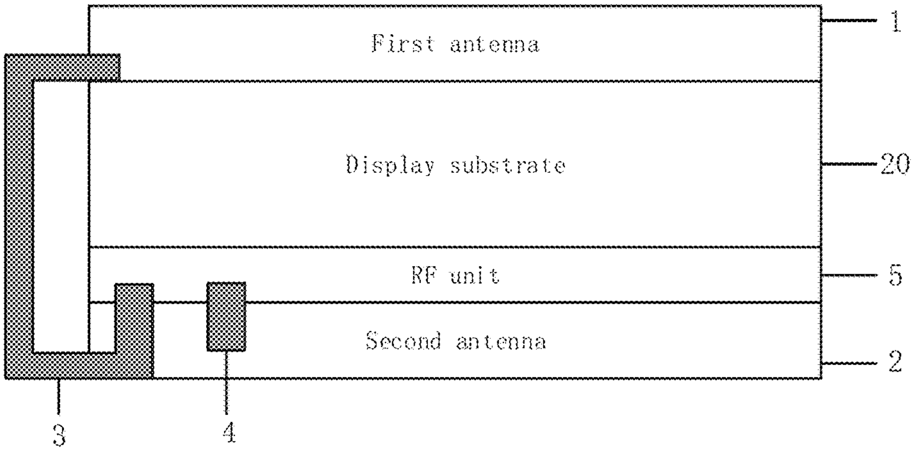
FIG. 1*b* is an application schematic diagram of an antenna module provided by an embodiment of the present disclosure.

The specific structure of the antenna module 100 provided by the embodiment of the present disclosure is described in detail below. In order to facilitate understanding of the embodiments of the present disclosure, the following description takes the AoD antenna 1 as the AoD antenna and the AiP antenna 2 as the AiP antenna as an example. FIG. 1*a* is a schematic diagram of an antenna module provided by an embodiment of the present disclosure. FIG. 1*b* is a schematic diagram of an application of an antenna module provided by an embodiment of the present disclosure. As shown in FIG. 1*a*, the antenna module 100 includes an AoD antenna 1, the first transmission structure 3, the AiP antenna 2, the second transmission structure 4, and the radio frequency unit 5. The AoD antenna 1 is electrically connected to the radio frequency unit 5 through at least the first transmission structure 3, and the AiP antenna 2 is electrically connected to the radio frequency unit 5 through the second transmission structure 4.

As shown in FIG. 1*b*, the antenna module 100 is applied to a display device 200. The display device 200 includes a display substrate 20 and other film layer structures. When the antenna module 100 is applied in the display device 200, the AoD antenna 1 is located on the display surface side of the display substrate 20 (that is, the light-emitting surface side), and the AiP antenna 2 is located on the side of the display substrate 20 away from the display surface (that is, the non-light-emitting side).

Exemplarily, the radio frequency unit 5 is located on a side of the display substrate 20 away from the display surface. The second transmission structure 4 may be a flexible structure and can be bent to electrically connect the AoD antenna 1 located on the light-emitting surface of the display substrate 20 to the radio frequency unit 5 on the non-light-emitting surface of the display substrate 20. Specifically, the radio frequency unit 5 is located between the AiP antenna 2 and the display substrate 20.

Exemplarily, the AoD antenna 1 includes a first radiation patch 11. When the antenna module 100 is applied in the display device 200, the electromagnetic field of the AoD antenna 1 is between the first radiation patch 11 and the display substrate 20, and the display substrate 20 is equivalent to the metal ground of the AoD antenna 1.

For example, because the AiP antenna module is thick, each mobile phone can only accommodate up to three AiP antenna modules. However, the cost of three AiP antenna modules is too high. In order to further reduce the product cost, the embodiment of the present disclosure chooses to use two AiP antennas, which reduce the millimeter wave signal coverage to a certain extent compared to three AiP antenna modules. However, the two AiP antennas can further combine with the AoD antenna to form the antenna module 100, to achieve signal enhancement.

Figure 2A:
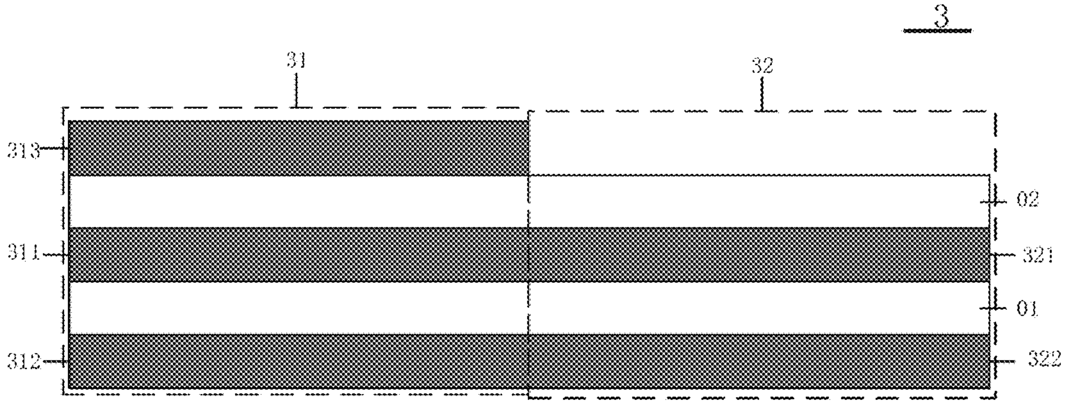
FIG. 2*a* is a schematic diagram of a film layer of a first transmission structure provided by an embodiment of the present disclosure.
Figure 2B:
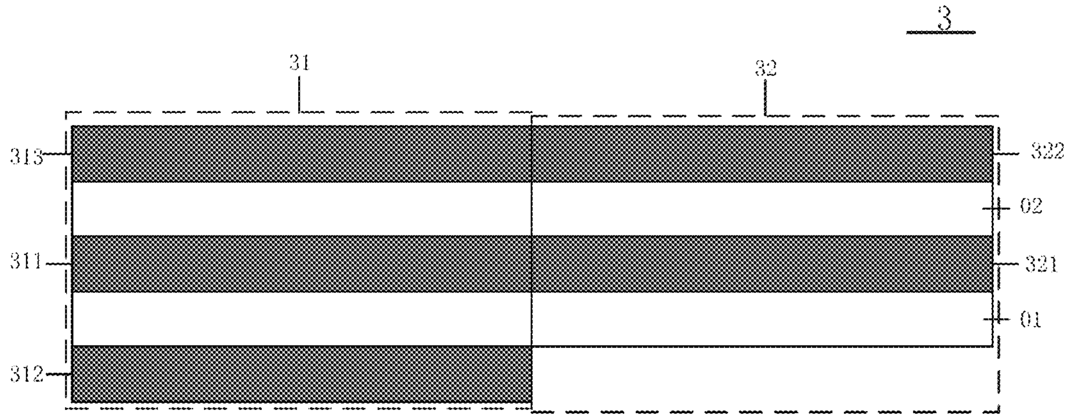
FIG. 2*b* is another schematic diagram of a film layer of the first transmission structure provided by an embodiment of the present disclosure.

In some embodiments, FIG. 2*a* is a schematic diagram of a film layer of a first transmission structure provided by an embodiment of the present disclosure, and FIG. 2*b* is another schematic diagram of a film layer of a first transmission structure provided by an embodiment of the present disclosure, as shown in FIG. 2*a* and FIG. 2*b*, the antenna module 100 also includes a first dielectric layer 01 and a second dielectric layer 02; the first transmission structure 3 includes a first transmission line 31 and a second transmission line 32. The first transmission line 31 includes a first signal electrode 311, a first reference electrode 312 and a second reference electrode 313; the first signal electrode 311 is provided between the first dielectric layer 01 and the second dielectric layer 02; the first reference electrode 312 is provided on a side of the first dielectric layer 01 away from the first signal electrode 311; the second reference electrode 313 is provided on the side of the second dielectric layer 02 away from the first signal electrode 311. The first reference electrode 312 and the second reference electrode 313 define the first signal electrode 311 therebetween, and the first signal electrode 311 is electrically connected to the radio frequency unit 5. The second transmission line 32 includes a second signal electrode 321 and a third reference electrode 322, wherein one of the second signal electrode 321 and the third reference electrode 322 is arranged between the first dielectric layer 01 and the second dielectric layer 02, and the other is provided on the side of the first dielectric layer 01 away from the second dielectric layer 02; the orthographic projections of the second signal electrode 321 and the third reference electrode 322 on the first dielectric layer 01 at least partially overlap; the second signal electrode 321 is electrically connected to the AoD antenna 1; the first signal electrode 311 is electrically connected to the second signal electrode 321.

As shown in FIG. 2*a*, the second signal electrode 321 is located between the first dielectric layer 01 and the second dielectric layer 02, and the third reference electrode 322 is located on the side of the first dielectric layer 01 away from the second dielectric layer 02. Exemplarily, the first reference electrode 312, the first dielectric layer 01, the first signal electrode 311, the second dielectric layer 02 and the second reference electrode 313 are stacked to form a strip line, that is, the first transmission line 31 is strip-shaped. line; the third reference electrode 322, the first dielectric layer 01 and the second signal electrode 321 form a microstrip line, that is, the second transmission line 32 is a microstrip line.

As shown in FIG. 2*b*, the third reference electrode 322 is located between the first dielectric layer 01 and the second dielectric layer 02, and the second signal electrode 321 is located on the side of the first dielectric layer 01 away from the second dielectric layer 02. Exemplarily, the first reference electrode 312, the first dielectric layer 01, the first signal electrode 311, the second dielectric layer 02 and the second reference electrode 313 are stacked to form a strip line, that is, the first transmission line 31 is strip-shaped line; the third reference electrode 322, the second dielectric layer 02 and the second signal electrode 321 form a microstrip line, that is, the second transmission line 32 is a microstrip line.

Here, the second transmission line 32 is a flexible structure. When the antenna module 100 is applied in the display device 200, the second transmission line 32 can be bent to electrically connect the AOD antenna 1 located on the light-emitting surface of the display substrate 20 to the RF unit 6 located on the non-light-emitting surface of the display substrate 20.

Figure 3A:
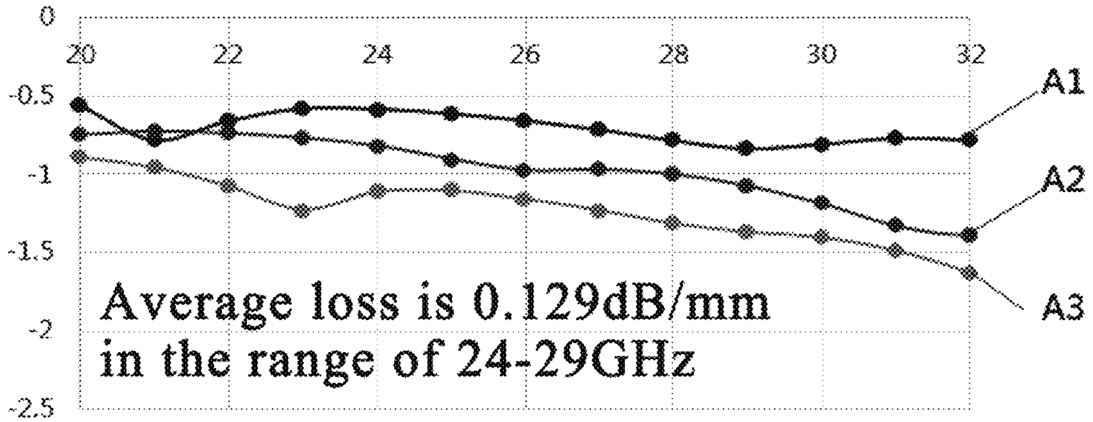
FIG. 3*a* is a schematic diagram of radio frequency loss simulation of a microstrip transmission line in an AoD antenna provided by an embodiment of the present disclosure.
Figure 3B:
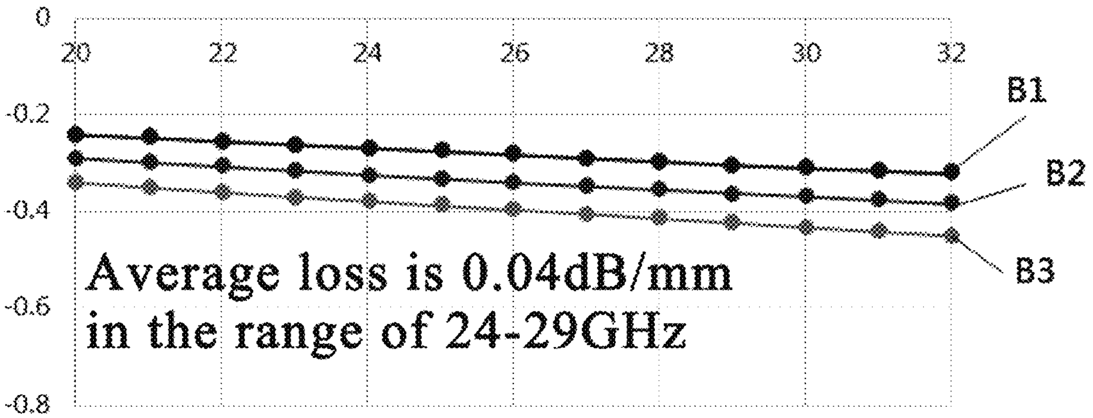
FIG. 3*b* is a schematic diagram of radio frequency loss simulation of the second transmission line provided by an embodiment of the present disclosure.
Figure 3C:
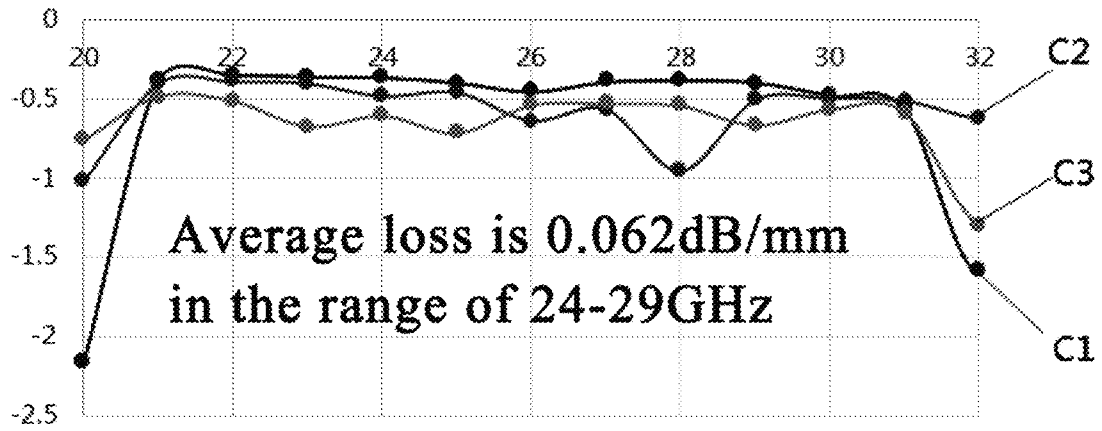
FIG. 3*c* is a schematic diagram of radio frequency loss simulation of the first transmission line to the second transmission line provided by the embodiment of the present disclosure.
Figure 3D:
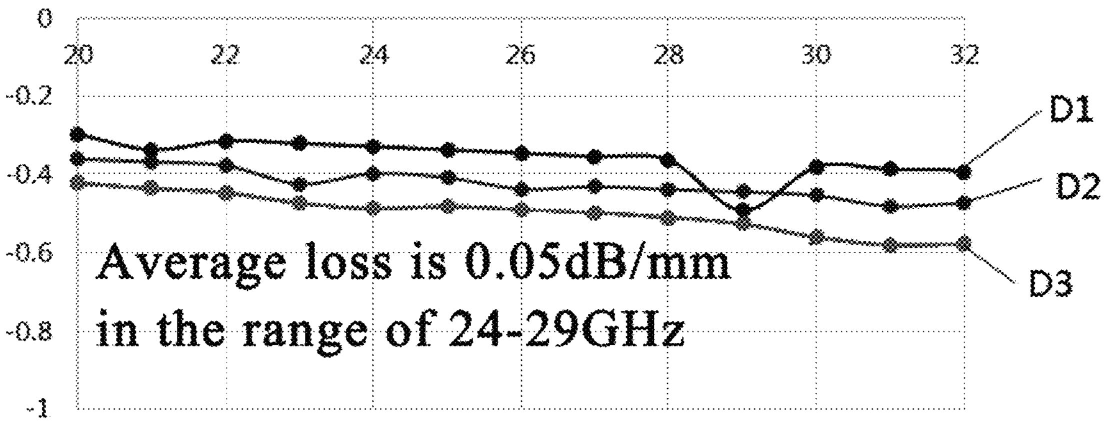
FIG. 3*d* is a schematic diagram of radio frequency loss simulation of the first transmission line provided by an embodiment of the present disclosure.

FIG. 3*a* is a schematic diagram of the radio frequency loss simulation of the microstrip transmission line in the AoD antenna provided by the embodiment of the present disclosure. FIG. 3*b* is a schematic diagram of the radio frequency loss simulation of the second transmission line provided by the embodiment of the present disclosure. FIG. 3*c* is a schematic diagram of the radio frequency loss simulation of the first transmission line to the second transmission line provided by the embodiment of the present disclosure. FIG. 3*d* is a schematic diagram of the radio frequency loss simulation of the first transmission line provided by an embodiment of the present disclosure. As shown in FIG. 3*a*, it shows the loss of the microstrip transmission line in AoD antenna 1 at the length of 5 mm, 7.5 mm and 10 mm in the 24 GHz-29 GHz millimeter wave communication frequency band, where curve A1 represents the loss of the microstrip transmission line in the AoD antenna 1 at a length of 5 mm.

Curve A2 represents the loss of the microstrip transmission line in AoD antenna 1 at a length of 7.5 mm. Curve A3 represents the loss of the microstrip transmission line in AoD antenna 1 at a length of 10 mm. As shown in FIG. 3*b*, it shows the loss of the second transmission line 32 with a length of 5 mm, 8.5 mm and 10 mm in the 24 GHz~29 GHz millimeter wave communication frequency band, where the curve B1 represents the loss of the second transmission line 32 with a length of 5 mm, Curve B2 represents the loss of the second transmission line 32 with a length of 8.5 mm, and curve B3 represents the loss of the second transmission line 32 with a length of 10 mm. As shown in FIG. 3*c*, it shows the loss of the first transmission line 31 and the second transmission line 32 of the total length of 5 mm, 8.5 mm and 10 mm, where the curve C1 represents the loss of the first transmission line 31 and the second transmission line 32 with a total length of 5 mm. The curve C2 represents the loss of the first transmission line 31 and the second transmission line 32 with the total length of 8.5 mm. The curve C3 represents the loss of the first transmission line 31 and the second transmission line 32 with the total length of 10 mm. As shown in FIG. 3*d*, it shows the loss of the first transmission line 31 at the length of 5 mm, 8.5 mm and 10 mm in the 24 GHz~29 GHz millimeter wave communication frequency band. The curve D1 represents the loss of the first transmission line 31 at the total length of 5 mm. The curve D2 represents the loss of the first transmission line 31 at the total length of 8.5 mm, and the curve D3 represents the loss of the first transmission line 31 at the total length of 10 mm.

Through the above loss simulation analysis, when the antenna module 100 is applied in the display device 200, the average loss of the AoD antenna 1 (microstrip line) located on the display surface side of the display device 200 in the range of 24 GHz-29 GHz is 0.129 dB/mm; the average loss of the second transmission line 32 (microstrip line) in the range of 24 GHz-29 GHz is 0.04 dB/mm; the average loss of the first transmission line 31 and the second transmission line 32 (strip line to microstrip line) in the range of 24 GHz-29 GHz is 0.062 dB/mm; the average loss of the first transmission line 31 (strip line) in the range of 24 GHz~29 GHz is 0.05 dB/mm.

What needs to be known is that at the same thickness, the width of the microstrip line will be wider, so the loss will be slightly smaller (the average loss data obtained from the above experiments can also illustrate this problem). However, in multi-layer boards, microstrip lines are mostly used on the surface layer. High-frequency signal lines transmitted on the surface layer are easily affected by external interference, affecting signal quality. The first transmission structure 3 of this embodiment uses a stripline-to-microstrip line method to realize the electrical connection between the AiP antenna 2 and the radio frequency unit 5, which can effectively reduce radio frequency losses and signal interference during the transmission process.

In some embodiments, in addition to the above-mentioned transmission line itself causing losses, different electrical connection methods between the second transmission line 32 and the AoD antenna 1 will also cause different losses.

Figure 4A:
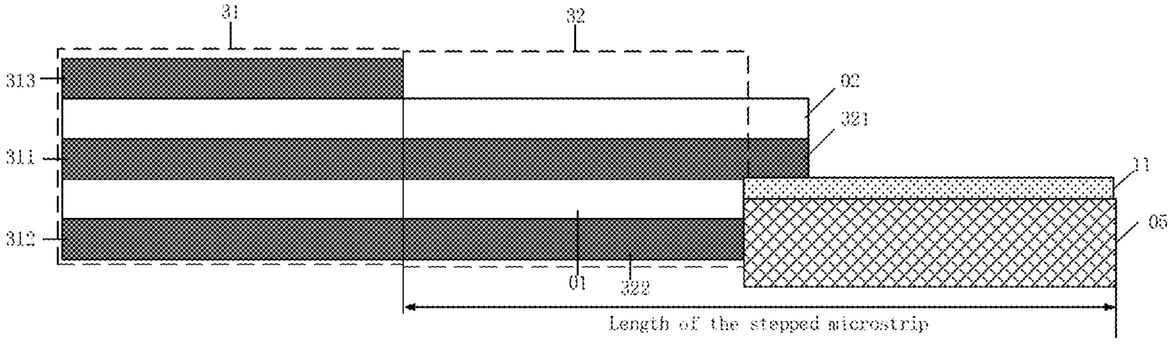
FIG. 4*a* is a schematic diagram of the direct connection between the second transmission line and the AoD antenna provided by the embodiment of the present disclosure.
Figure 4B:
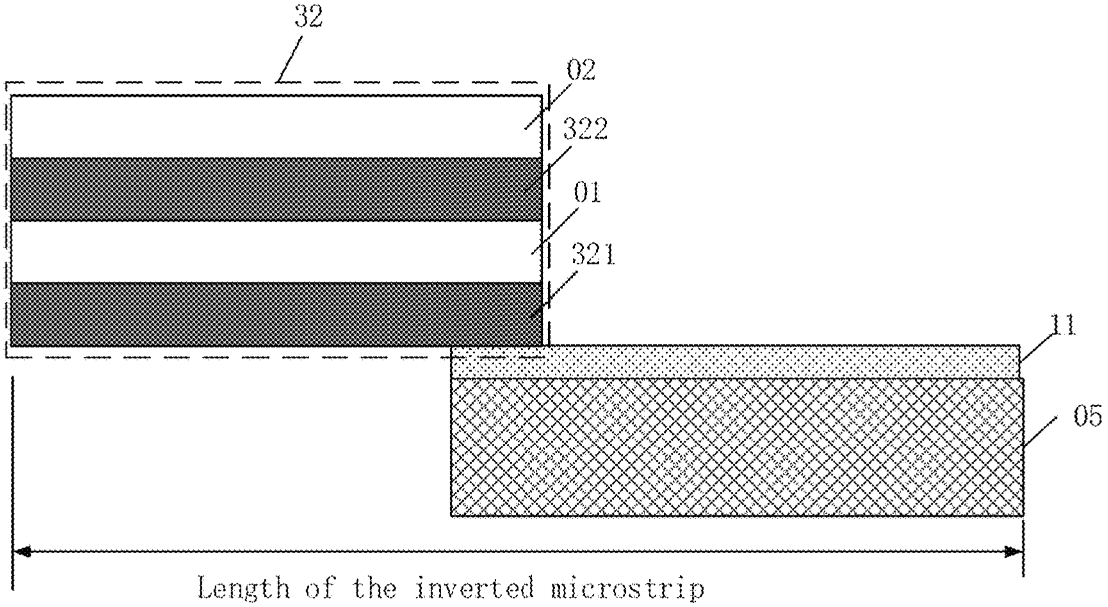
FIG. 4*b* is a schematic diagram of the direct connection between the inverted second transmission line and the AoD antenna provided by the embodiment of the present disclosure.
Figure 4C:
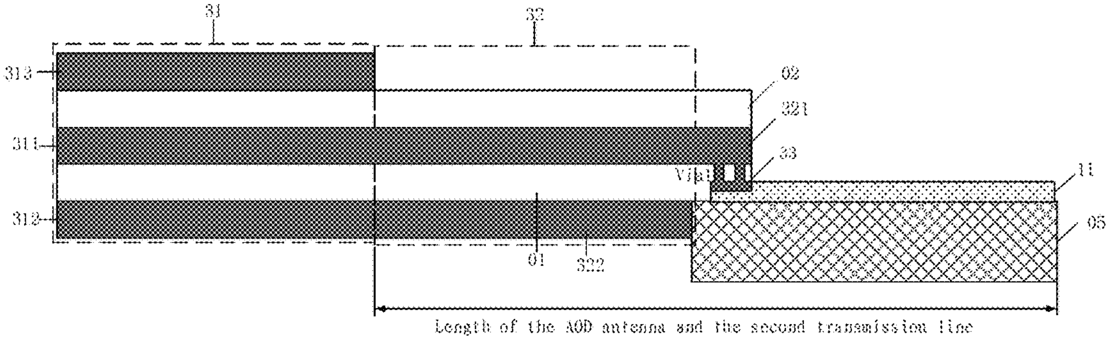
FIG. 4*c* is a schematic diagram of the connection between the second transmission line and an AoD antenna through a via hole according to an embodiment of the present disclosure.

FIG. 4*a* is a schematic diagram of a second transmission line directly connected to an AoD antenna provided by an embodiment of the present disclosure. FIG. 4*b* is a schematic diagram of an inverted second transmission line directly connected to an AoD antenna provided by an embodiment of the present disclosure. FIG. 4*c* is a schematic diagram of the second transmission line connected to the AoD antenna through a via hole provided by an embodiment of the present disclosure.

The methods of electrical connection between the second signal electrode 321 and the AoD antenna 1 may include the following: Method 1. The second signal electrode 321 and the AoD antenna 1 are directly bonded and connected. For example, as shown in FIG. 4*a*, the second signal electrode 321 is provided with a first bonding pad, and the first radiation patch 11 of the AoD antenna 1 is provided with a second bonding pad. When the second signal electrode 321 is arranged between the first dielectric layer 01 and the second dielectric layer 02, the first pad on the second signal electrode 321 is directly bonded to the second pad on the first radiation patch 11. Method 2: as compared with the first connection method, an inverted second transmission line 32 can be provided. For example, as shown in FIG. 4*b*, the second signal electrode 321 is provided with a first bonding pad, and the first radiation patch 11 of the AoD antenna 1 is provided with a second bonding pad. When the third reference electrode 322 is arranged between the first dielectric layer 01 and the second dielectric layer 02, and the second signal electrode 321 is arranged on the first dielectric layer 01 away from the third reference electrode 322, the first pad on the second signal electrode 321 is directly bonded to the second pad on the first radiation patch 11. It should be noted that when connection method 2 is adopted, the third reference electrode 322 is a grounded coplanar waveguide (GCPW) electrode. Method 3: The second signal electrode 321 is bonded to the AoD antenna 1 through a via hole (that is, the first via hole Via1). For example, as shown in FIG. 4*c*, a first pad 33 is provided at one end of the first via Via1 where the second signal electrode 321 penetrates the first dielectric layer 01, and a second pad 33 is provided on the first radiation patch 11 of the AoD antenna 1. When the second signal electrode 321 is arranged between the first dielectric layer 01 and the second dielectric layer 02, the second signal electrode 321 is bonded and connected to the AoD antenna 1 through the first via hole Via1 penetrating the first dielectric layer 01, that is, the first pad on the second signal electrode 321 is bonded to the second pad on the first radiation patch 11.

Table 1 shows the data information of the loss of each part when the second transmission line 32 is directly connected to the AoD antenna 1; Table 2 shows the data information of the loss of each part when the second transmission line 32 is inverted and directly connected to the AoD antenna 1; Table 3 shows the data information of the loss of each part when the second transmission line 32 and the AoD antenna 1 are connected through a via hole.

TABLE 1

| | | Fre(GHz) | | | | | | |
|---|---|---|---|---|---|---|---|---|
| | loss (dB) | 24 | 25 | 26 | 27 | 28 | 29 | 30 |
| AOD antenna 1 (microstrip line) loss | 5 mm | 0.59 | 0.62 | 0.66 | 0.72 | 0.79 | 0.84 | 0.81 |
| Second transmission line 32 | 8.5 mm | 0.32 | 0.33 | 0.34 | 0.35 | 0.36 | 0.36 | 0.37 |

TABLE 1-continued

| | loss (dB) | Fre(GHz) 24 | 25 | 26 | 27 | 28 | 29 | 30 |
|---|---|---|---|---|---|---|---|---|
| (microstrip line) loss | | | | | | | | |
| Stepped microstrip loss | 5 mm + 8.5 mm (0.6 mm overlp) | 3.17 | 2.25 | 2.89 | 2.51 | 2.62 | 3.04 | 4.35 |
| Overlapping position loss | 0.6 mm | 2.26 | 1.62 | 1.89 | 1.44 | 1.47 | 1.84 | 3.17 |

It can be seen from the data in Table 1 above that when the second transmission line 32 is directly bonded to the AoD antenna 1, the average loss at the overlapping position is 1.956 dB. The average loss of stepped microstrip is 2.976 dB. However, this method of direct bonding of microstrip lines has a step difference in the bonding area, which seems reasonable, but the actual loss is too large.

TABLE 2

| | loss (dB) | fre (GHz) 24 | 25 | 26 | 27 | 28 | 29 | 30 |
|---|---|---|---|---|---|---|---|---|
| AOD antenna 1 (microstrip line) loss | 5 mm | 0.59 | 0.62 | 0.66 | 0.72 | 0.79 | 0.84 | 0.81 |
| Second transmission line 32 (microstrip line) loss | 8.5 mm | 0.32 | 0.33 | 0.34 | 0.35 | 0.36 | 0.36 | 0.37 |
| inverted microstrip loss | 5 mm + 8.5 mm (0.6 mm overlp) | 3.76 | 3.32 | 3.28 | 3.45 | 3.83 | 4.54 | 5.91 |
| Overlapping position loss | 0.6 mm | 2.85 | 2.37 | 2.28 | 2.38 | 2.68 | 3.34 | 4.73 |

From the data in Table 2, it can be seen that when the second transmission line 32 is inverted and bonded to the AoD antenna 1, the average loss of the stepped microstrip is 2.976 dB, which is not much different from the loss of the direct bonding method, and there is no step difference in the bonding area. However, the actual loss of this inverted microstrip bonding method is greater, and the average loss at the overlapping position reaches 2.947 dB.

The bonding connection loss in the above two comparative examples is relatively large. The main reason is that the electromagnetic field of the second transmission line 32 is between the second signal electrode 321 and the third reference electrode 322, and the electromagnetic field of the AoD antenna 1 is between the first radiation patch 11 and the display substrate 20 (equivalent to the metal ground), the second signal electrode 321 is directly bonded to the AoD antenna 1, which cannot achieve a smooth transition of the electromagnetic field. There may be a serious mismatch or a reversal of the electromagnetic energy, so the loss is large.

TABLE 3

| | loss (dB) | fre (GHz) 24 | 25 | 26 | 27 | 28 | 29 | 30 |
|---|---|---|---|---|---|---|---|---|
| AOD antenna 1 (microstrip line) loss | 5 mm | 0.59 | 0.62 | 0.66 | 0.72 | 0.79 | 0.84 | 0.81 |
| Second transmission line 32 (microstrip line) | 8.5 mm | 0.32 | 0.33 | 0.34 | 0.35 | 0.36 | 0.36 | 0.37 |
| AOD antenna 1 and Second transmission line 32 loss | 5 mm + 8.5 mm (0.6 mm overlp) | 1.2 | 1.29 | 1.42 | 1.58 | 1.79 | 2.10 | 2.71 |
| Overlapping position loss | 0.6 mm | 0.29 | 0.34 | 0.42 | 0.51 | 0.64 | 0.90 | 1.53 |

It can be seen from the data in Table 3 that the second transmission line 32 is bonded to the AoD antenna 1 through a via hole. The average loss of the AoD antenna 1 and the second transmission line 32 is 1.727 dB, and the average loss at the overlapping position is 0.661 dB. Both are smaller than the average losses at the overlapping positions in the above two comparative examples. Comparing the analysis of the above comparative examples, it can be seen that in the embodiment of the present disclosure, the second signal electrode 321 is bonded to the first radiation patch 11 in the AoD antenna 1 through the first via hole Via1, which introduces minimal loss and can achieve a smooth transition of the electromagnetic field.

In some embodiments, as shown in FIG. 2*a*, when the third reference electrode 322 is arranged on the side of the first dielectric layer 01 away from the second signal electrode 321, the third reference electrode 322 and the first reference electrode 312 are an integral structure. Alternatively, as shown in FIG. 2*b*, when the third reference electrode 322 is arranged on the side of the second dielectric layer 02 away from the second signal electrode 321, the third reference electrode 322 and the second reference electrode 313 are an integral structure. Here, the reference electrodes located on the same layer are integrally formed during the preparation process, which can simplify the preparation process and improve preparation efficiency.

In some embodiments, as shown in FIG. 2*a* or FIG. 2*b*, when the second signal electrode 321 is located between the first dielectric layer 01 and the second dielectric layer 02, the first signal electrode 311 and the second signal electrode 321 are arranged in the same layer and are an integrated structure. Such setting can simplify the preparation process and improve the preparation efficiency.

In some embodiments, the material of the first dielectric layer 01 may be a flexible material, such as a polymer liquid crystal polymer (LCP). This LCP has high transmission performance, with a dielectric constant of about 3 and a loss of about 0.002 dB. Compared with polyimide (PI) and printed circuit board (PCB), LCP can effectively reduce losses.

Combined with the above embodiments, during the signal transmission process, the radio frequency loss will increase due to the increase in the length of the first transmission structure 3. Therefore, the actual first transmission structure 3 cannot be infinitely long and needs to be controlled within a certain range to avoid excessive loss. For example, on the premise of meeting design requirements, the shorter the first transmission structure 3 is, the better is.

Figure 5:
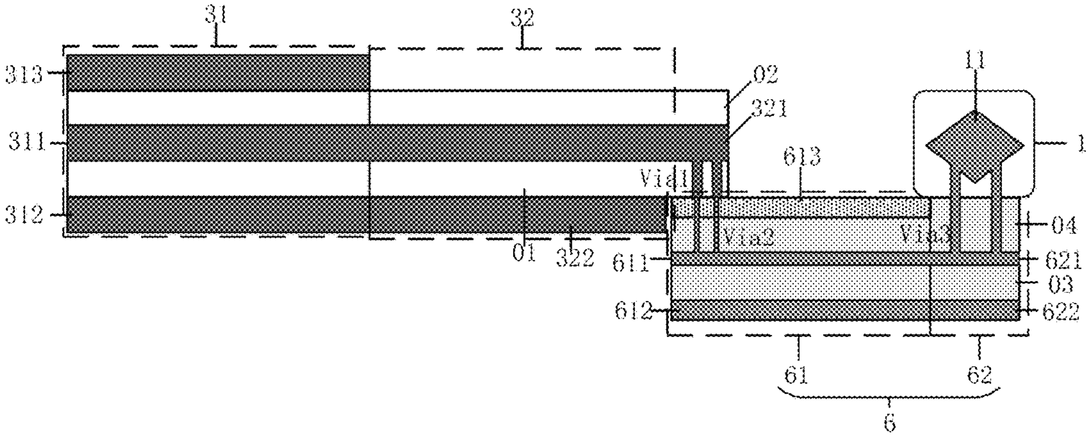
FIG. 5 is a schematic structural diagram of the connection between the first transmission structure and the third transmission structure provided by the embodiment of the present disclosure.

In some embodiments, FIG. 5 is a schematic structural diagram of the connection between the first transmission structure and the third transmission structure provided by the embodiment of the present disclosure. As shown in FIG. 5, the antenna module 100 also includes a third transmission structure 6. The third transmission structure 6 is electrically connected to the first transmission structure 3; the AoD antenna 1 is electrically connected to the radio frequency unit 5 through the first transmission structure 3 and the third transmission structure 6.

Here, the second transmission line 32 in the first transmission structure 3 is a flexible structure, the second transmission line 32 is electrically connected to the third transmission structure 6, and the third transmission structure 6 is directly connected to the AoD antenna 1. When the antenna module 100 is applied in the display device 200, the third transmission structure 6 and the AoD antenna 1 are both located on the light-emitting surface side of the display substrate 20, and by bending the second transmission line 32, the AoD located on the light-emitting surface of the display substrate 20 can be electrically connected to the radio frequency unit 5 located on the non-light-emitting surface of the display substrate 20.

The AoD antenna 1 realizes the electrical connection with the radio frequency unit 5 through two parts of transmission structures. When receiving a signal, the AoD antenna 1 first sends the signal to the third transmission structure 6, and the third transmission structure 6 then transmits the signal to the first transmission structure 3. The first transmission structure 3 then feeds the signal to the radio frequency unit 5. On the contrary, when transmitting a signal, the radio frequency unit 5 sends the signal to the first transmission structure 3, the first transmission structure 3 then transmits the signal to the third transmission structure 6, and finally, the third transmission structure 6 feeds the signal to the AoD antenna 1 for emission.

Figure 18A:
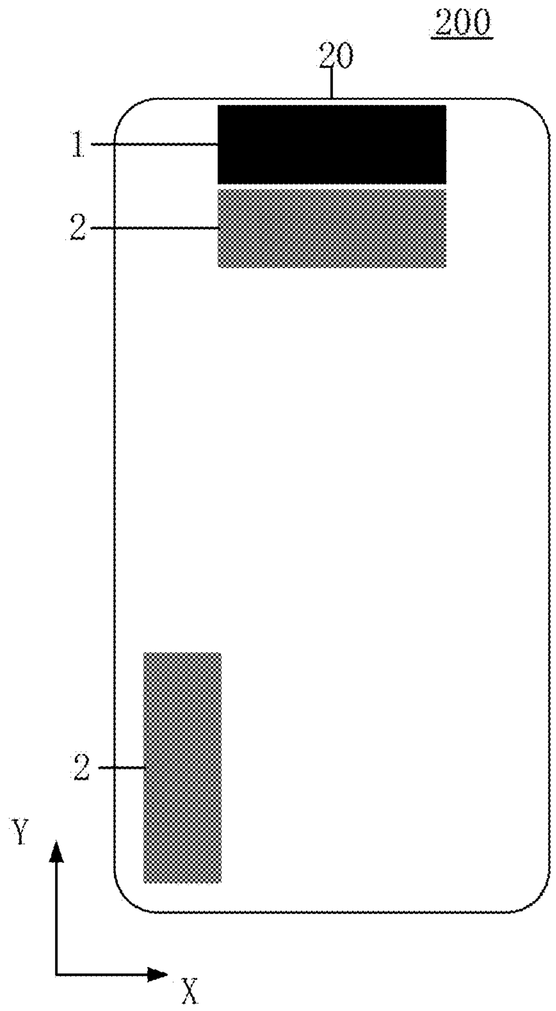
FIG. 18*a* is a schematic diagram of the layout of an AoD antenna and AiP antenna on a display substrate provided by an embodiment of the present disclosure.
Figure 18B:
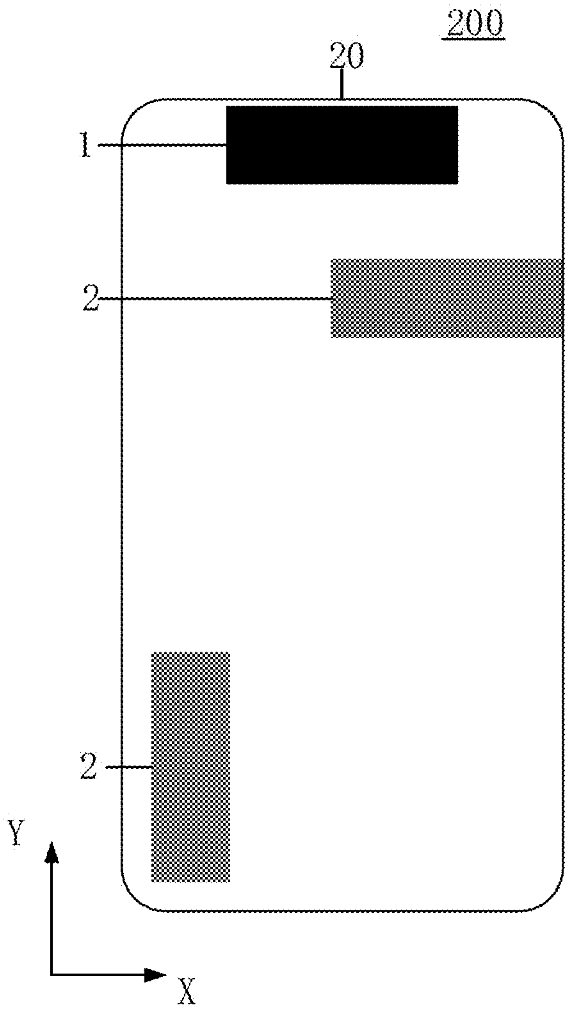
FIG. 18*b* is another schematic diagram of the layout of an AoD antenna and AiP antenna on a display substrate provided by an embodiment of the present disclosure.
Figure 18C:
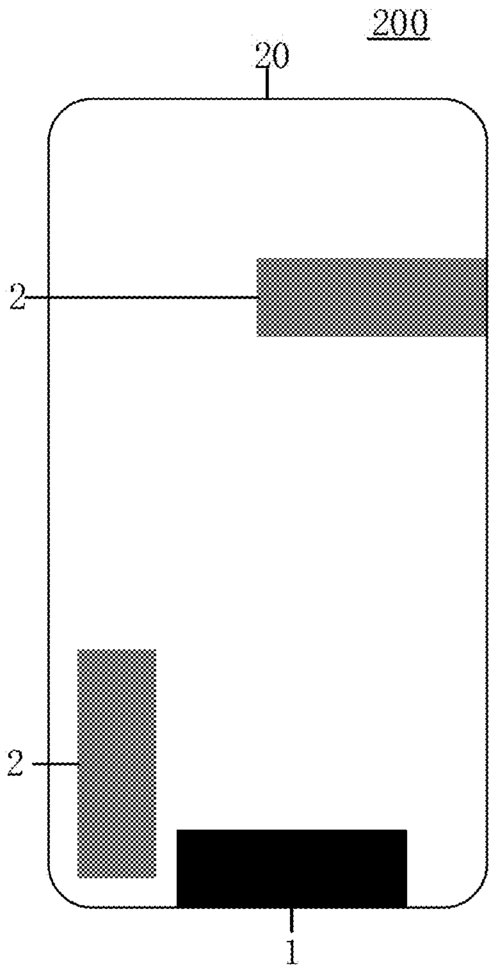
FIG. 18*c* is another schematic diagram of the layout of an AoD antenna and AiP antenna on a display substrate provided by an embodiment of the present disclosure.

The embodiment of the present disclosure provides a transfer structure (that is, the third transmission structure 6), which is equivalent to extending the transmission structure between the radio frequency unit 5 and the AoD antenna 1. When the antenna module 100 is applied in the display device 200, the third transmission structure 6 is located on the display surface side of the display device 200, and the radio frequency unit 5 is located on the side of the display device 200 away from the display surface. Using the third transmission structure 6 for transfer, it can improve the flexibility of integration between the AoD antenna 1 and the radio frequency unit 5, for example, when the setting position of the radio frequency unit 5 is fixed, through the transfer of the third transmission structure 6, the setting position of the AoD antenna 1 on the display surface side can be flexibly adjusted, as shown in FIGS. 18*b* and 18*c*, the omnidirectional millimeter wave coverage may be achieved. Alternatively, when the position of the AoD antenna 1 is fixed, the installation position of the radio frequency unit 5 can also be flexibly adjusted through the transfer of the third transmission structure 6.

In some embodiments, as shown in FIG. 5, the antenna module 100 also includes a third dielectric layer 03 and a fourth dielectric layer 04; when the antenna module 100 is applied in the display device 200, the third transmission structure 6, the third dielectric layer 03 and the fourth dielectric layer 04 are all located on the display surface side of the display device 200; the third transmission structure 6 includes a third transmission line 61 and a fourth transmission line 62; the third transmission line 61 includes a third signal electrode 611, a fourth reference electrode 612 and a fifth reference electrode 613; the third signal electrode 611 is provided between the third dielectric layer 03 and the fourth dielectric layer 04; the fourth reference electrode 612 is provided on the side of the third dielectric layer 03 away from the third signal electrode 611; the fifth reference electrode 613 is arranged on the side of the fourth dielectric layer 04 away from the second signal electrode 321. The fourth reference electrode 612 and the fifth reference electrode 613 define the second signal electrode 321 therebetween, and the third signal electrode 611 is electrically connected to the second signal electrode 321; the fourth transmission line 62 includes a fourth signal electrode 621 and a sixth reference electrode 622, and the fourth signal electrode 621 is provided on the side of the third dielectric layer 03 close to the fourth dielectric layer 04; the sixth reference electrode 622 is arranged on the side of the third dielectric layer 03 away from the fourth signal electrode 621; the orthographic projections of the fourth signal electrode 621 and the sixth reference electrode 622 on the fourth dielectric layer 04 at least partially overlap; the fourth signal electrode 621 is electrically connected to the third signal electrode 611; the sixth reference electrode 622 and the fourth reference electrode 612 are electrically connected.

Continuing as shown in FIG. 5, the fourth reference electrode 612, the third dielectric layer 03, the third signal electrode 611, the fourth dielectric layer 04 and the fifth reference electrode 613 that are stacked form a strip line, that is, the third transmission line 61 is a strip line; the sixth reference electrode 622, the third dielectric layer 03, the fourth signal electrode 621 and the fourth dielectric layer 04 form a microstrip line, that is, the fourth transmission line 62 is a microstrip line. In this embodiment, the stripline-to-microstrip line structure can effectively reduce radio frequency loss and signal interference during signal transmission.

In some embodiments, combined with the above embodiments, as shown in FIG. 5, when the second signal electrode 321 is arranged between the first dielectric layer 01 and the second dielectric layer 02, the second signal electrode 321 is bonded to the third signal electrode 611 through the first via hole Via1 penetrating the first dielectric layer 01 and the second via hole Via2 penetrating the fourth dielectric layer 04.

Referring to the analysis results in Table 1, Table 2 and Table 3 above, it can be seen that the loss introduced by the penetrating the via hole and rebonding method is minimal and the smooth transition of the electromagnetic field can be achieved. Therefore, in this embodiment, the electrical connection method between the third transmission line 61 and the second transmission line 32 adopts bonding connection. For example, the first pad 33 is provided at one end of the first via hole Via1 where the second signal electrode 321 penetrates the first dielectric layer 01, and the third bonding pad is provided on one end of the second via hole where the third signal electrode 611 penetrates the fourth dielectric layer 04, the first bonding pad on the second signal electrode 321 is bonded to the third bonding pad on the third signal electrode 611.

In some embodiments, combined with the above embodiments, as shown in FIG. 5, the fourth signal electrode 621 is bonded and connected to the AoD antenna 1 through the third via hole Via3 penetrating the fourth dielectric layer 04.

In this embodiment, the electrical connection between the fourth signal line and the AoD antenna 1 adopts bonding connection. For example, a fourth soldering pad is provided at one end of the third via hole Via3 of the fourth signal electrode 621 penetrating the fourth dielectric layer 04, a second soldering pad is provided on the first radiation patch 11 of the AoD antenna 1, and the fourth soldering pad on the fourth signal electrode 621 is bonded to the second soldering pad on the first radiation patch 11. Compared with the method of directly binding the signal electrode without through the via hole, this embodiment can reduce the radio frequency loss through via hole bonding. A smooth transition of the electromagnetic field between the third transmission structure 6 and the first transmission structure 3 and the electromagnetic field between the third transmission structure 6 and the AoD antenna 1 is achieved.

In some embodiments, as shown in FIG. 5, the third signal electrode 611 and the fourth signal electrode 621 are arranged on the same layer and have an integrally formed structure. This arrangement can simplify the manufacturing process and improve the manufacturing efficiency.

In some embodiments, as shown in FIG. 5, the fourth reference electrode 612 and the sixth reference electrode 622 are arranged in the same layer and have an integrally formed structure. This arrangement can simplify the preparation process and improve the preparation efficiency.

Regarding the AoD antenna 1 involved in the above embodiment, the antenna module 100 further includes a fifth dielectric layer 05, and the AoD antenna 1 includes a first radiation patch 11 arranged on the first surface of the fifth dielectric layer 05. The material of the fifth dielectric layer 05 can be cyclo olefin polymer (COP) material. The fifth dielectric layer 05 is also a COP base material. The COP base material has a high transmittance and is convenient for improving light transmittance in the display device 200 for subsequent applications.

Figure 6:
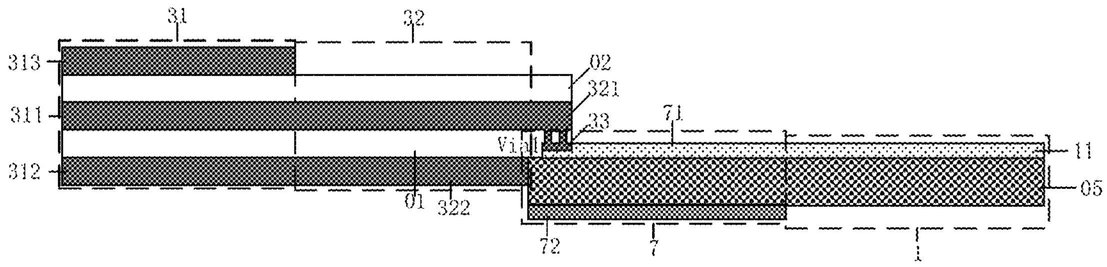
FIG. 6 is a schematic structural diagram of the connection between the first transmission structure and the fourth transmission structure provided by an embodiment of the present disclosure.

In some embodiments, FIG. 6 is a schematic structural diagram of the connection between the first transmission structure and the fourth transmission structure provided by the embodiment of the present disclosure. As shown in FIG. 6, the antenna module 100 also includes a fourth transmission structure 7. The fourth transmission structure 7 is electrically connected to the first transmission structure 3; the AoD antenna 1 is electrically connected to the radio frequency unit 5 through the first transmission structure 3 and the fourth transmission structure 7.

Here, the fourth transmission structure 7 is a flexible structure. When the antenna module 100 is applied in the display device 200, the fourth transmission structure 7 can be bent to electrically connect the AoD antenna 1 located on the light-emitting surface of the display substrate 20 to the radio frequency unit 5 on the non-light-emitting side of the display substrate 20.

The AoD antenna 1 realizes the electrical connection with the radio frequency unit 5 through a two-part transmission structure. When receiving a signal, the AoD antenna 1 first sends the signal to the fourth transmission structure 7, and the fourth transmission structure 7 then transmits the signal to the first transmission structure. 3. The first transmission structure 3 then feeds the signal to the radio frequency unit 5. On the contrary, when transmitting a signal, the radio frequency unit 5 sends the signal to the first transmission structure 3, the first transmission structure 3 then transmits the signal to the fourth transmission structure 7, and finally, the fourth transmission structure 7 feeds the signal to the AoD antenna 1 for emission.

In some embodiments, as shown in FIG. 6, the antenna module 100 also includes a fifth dielectric layer 05. The fifth dielectric layer 05 includes a first surface and a second surface that are oppositely arranged along its thickness direction; the AoD antenna 1 includes a first radiation patch 11 on the first surface of the fifth dielectric layer 05; the fourth transmission structure 7 includes a fifth signal electrode 71 and a seventh reference electrode 72; the fifth signal electrode 71 is arranged on the first surface of the fifth dielectric layer 05, the seventh reference electrode 72 is arranged on the second surface of the fifth dielectric layer 05, and the orthographic projections of the fifth signal electrode 71 and the seventh reference electrode 72 on the fifth dielectric layer 05 at least partially overlap; the fifth signal electrode 71 is electrically connected to the first radiation patch 11; the fifth signal electrode 71 is electrically connected to the second signal electrode 321.

Continuing as shown in FIG. 6, the seventh reference electrode 72, the fifth dielectric layer 05 and the fifth signal electrode 71 that are stacked form a microstrip line, that is, the fourth transmission structure 7 is a microstrip line. In this way, the fourth transmission structure 7 and the second transmission line 32 form the entire microstrip line structure, which can effectively reduce radio frequency losses during transmission. At the same time, it is further transferred to the first transmission line 31 to form a microstrip to stripline structure to reduce signal interference.

In some embodiments, combined with the above embodiments, as shown in FIG. 6, when the second signal electrode 321 is arranged between the first dielectric layer 01 and the second dielectric layer 02, the second signal electrode 321 is bonded to the fifth signal electrode 71 through the first via hole Via1 penetrating the first dielectric layer 01.

In this embodiment, the electrical connection method between the fourth transmission structure 7 and the second transmission line 32 adopts bonding connection. For example, a first soldering pad is provided at one end of the first via Via1 of the second signal electrode 321 penetrating the first dielectric layer 01, a fifth soldering pad is provided on the fifth signal electrode 71, and the first soldering pad on the second signal electrode 321 is bonded to the fifth soldering pad on the fifth signal electrode 71. Compared with the signal electrode being directly bound without passing through the via hole, in this embodiment, the radio frequency loss can be reduced through bonding through the first via Via1, thereby achieving the smooth transition of the electromagnetic field between the fourth transmission structure 7 and the first transmission structure 3.

In some embodiments, as shown in FIG. 6, the fifth signal electrode 71 and the first radiation patch 11 are arranged on the same layer and have an integrated structure. Such arrangement can simplify the manufacturing process and improve the manufacturing efficiency.

Figure 7:
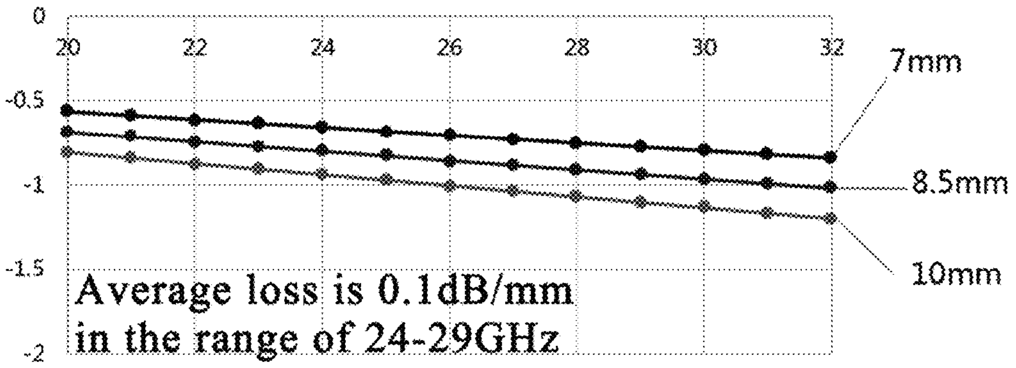
FIG. 7 is a schematic diagram of radio frequency loss simulation of the fourth transmission structure provided by an embodiment of the present disclosure.

In some embodiments, for the antenna module 100 shown in FIG. 6, the material of the fifth dielectric layer 05 can be a flexible material, such as colorless polyimide (CPI), which is highly transparent PI. That is, the fifth dielectric layer 05 is a CPI base material. The CPI base material has higher bending resistance than COP base material, and its relative cost is also higher. PI is selected as the material of the fifth dielectric layer 05, and the fourth transmission structure 7 is used as the PI microstrip line. FIG. 7 is a schematic diagram of the radio frequency loss simulation of the fourth transmission structure provided by the embodiment of the present disclosure, as shown in FIG. 7, which shows the losses of the fourth transmission structure in the 24 GHz~29 GHz millimeter wave communication frequency band when the total length of the fourth transmission structure is 7 mm, 8.5 mm and 10 mm respectively. Through the above loss simulation analysis, the average loss of the fourth transmission structure 7 (PI microstrip line) in the 24 GHz~29 GHz range is 0.1 dB/mm.

The CPI base material is divided into two parts, one part serves as the base material of the first radiation patch 11, and the other part cooperates with the fifth signal electrode 71 as the fourth transmission structure 7, when the antenna module 100 is applied in the display device 200, the fourth transmission structure 7 is bent and bonded to the first transmission structure 3.

Figure 8:
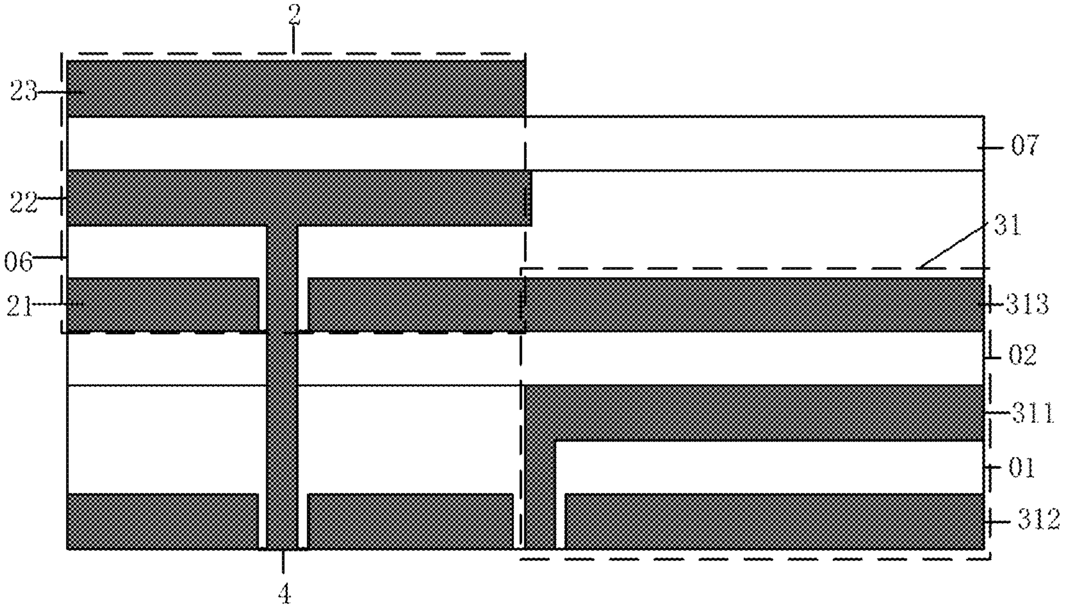
FIG. 8 is a schematic structural diagram of the integration of the AiP antenna and the first transmission structure provided by an embodiment of the present disclosure.

In some embodiments, FIG. 8 is a schematic structural diagram of the integration of the AiP antenna and the first transmission structure provided by the embodiment of the present disclosure. As shown in FIG. 8, the antenna module 100 also includes a sixth dielectric layer 06 and a seventh dielectric layer 07; AiP antenna 2 includes an eighth reference electrode 21, a second radiation patch 22 and a third radiation patch 23; the eighth reference electrode 21 is provided between the second dielectric layer 02 and the sixth dielectric layer 06; the second radiation patch 22 is arranged between the sixth dielectric layer 06 and the seventh dielectric layer 07; the third radiation patch 23 is arranged on the side of the seventh dielectric layer 07 away from the second radiation patch 22; the orthographic projections of the eighth reference electrode 21, the second radiation patch 22 and the third radiation patch 23 on the second dielectric layer 02 at least partially overlap; the second radiation patch 22 is electrically connected to the second transmission structure 4.

Figure 9A:
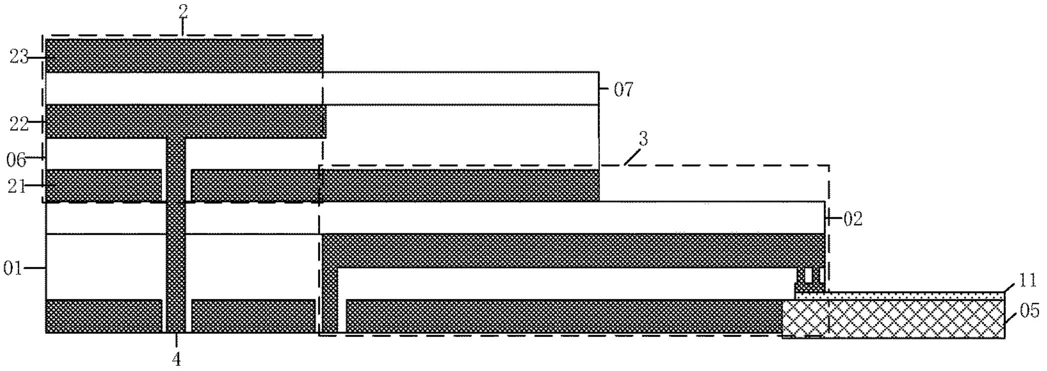
FIGS. 9*a* to 9*c* are schematic diagrams of three different integration methods of AoD antennas and AiP antennas provided by embodiments of the present disclosure.
Figure 9B:
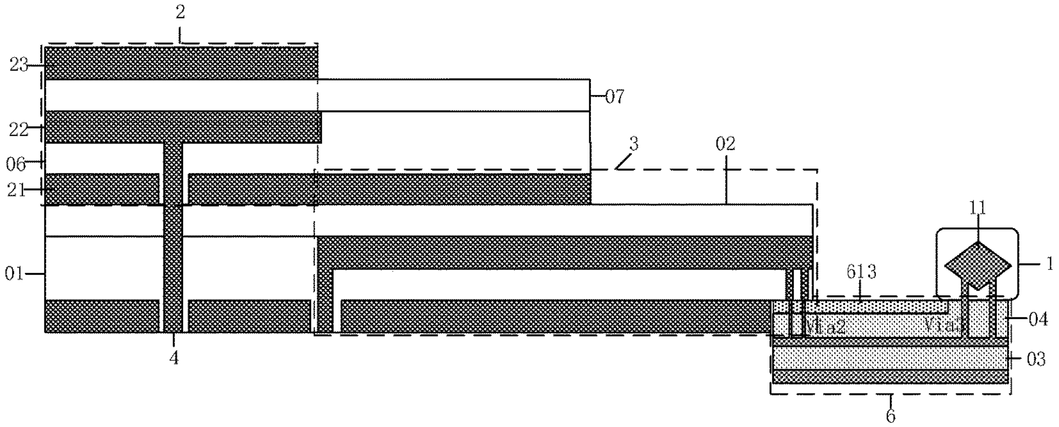
Figure 9C:
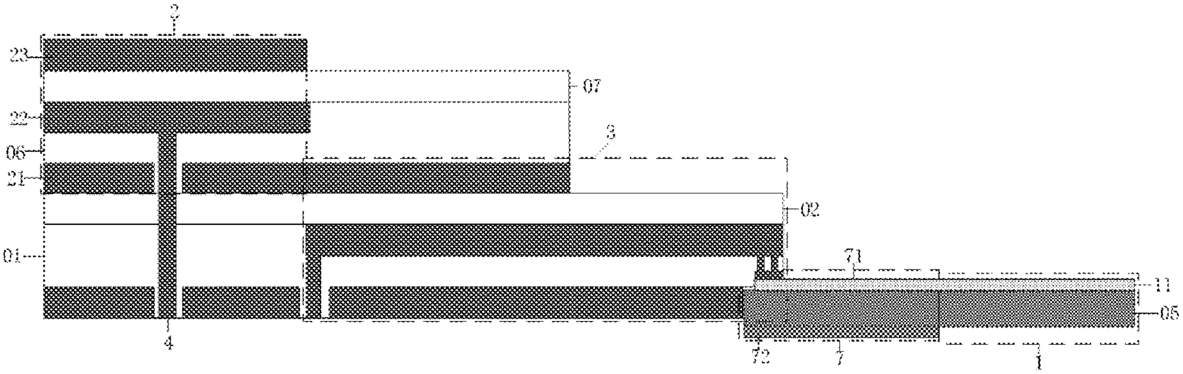

This embodiment is combined with the above three connection methods of AoD antenna 1 and radio frequency unit 5 to form three integration solutions of AoD antenna 1 and AiP antenna 2. FIGS. 9*a* to 9*c* are schematic diagrams of three different integration methods of AoD antennas and AiP antennas provided by embodiments of the present disclosure. As shown in FIGS. 9*a* to 9*c*, the AiP antenna 2 is arranged on one side of the second dielectric layer 02 away from the first dielectric layer 01, the first transmission structure 3, the second transmission structure 4 and the AiP antenna 2 are integrated together to form an antenna integration unit to achieve a high degree of integration of the antenna module 100. Furthermore, the AoD antenna 1 and the AiP antenna 2 share the same radio frequency unit 5. The antenna integration unit and the radio frequency unit 5 can be integrated again to further optimize the antenna module 100 to achieve omnidirectional millimeter wave coverage while reducing the overall space occupied by the antenna module 100, making the layout more convenient and realizing product miniaturization.

Here, the second radiation patch 22 is electrically connected to the second transmission structure 4. Specifically, the second transmission structure 4 is connected to the radio frequency unit 5 through via holes that at least penetrate the sixth dielectric layer 06, the second dielectric layer 02 and the first dielectric layer 01.

In some embodiments, as shown in FIG. 8, the eighth reference electrode 21 and the second reference electrode 313 are integrally formed structures. Here, the second reference electrode 313 of the first transmission line 31 and the eighth reference electrode 21 of the AiP antenna 2 are multiplexed into the same metal layer, further achieving a high degree of integration of the AiP antenna 2 and the first transmission structure 3 and simplifying the manufacturing process, and improving preparation efficiency.

In some embodiments, the second dielectric layer 02 includes a two-layer laminated structure, one of which is an LCP layer and the other is an adhesive layer. The LCP layer is closer to the AiP antenna 2 than the adhesive layer, and the adhesive layer is configured to bond the AiP antenna 2 located on the LCP layer to the first transmission structure 3 together.

In some embodiments, the sixth dielectric layer 06 and the seventh dielectric layer 07 can be made of flexible materials, such as liquid crystal polymer (LCP). This LCP has high transmission performance, with a dielectric constant of about 3 and a loss of about 0.002 dB. Compared with polyimide (PI) and printed circuit board (PCB), LCP can effectively reduce losses.

It should be noted that the reference electrodes involved in the embodiment of the present disclosure (including the first reference electrode 312, the second reference electrode 313, the third reference electrode 322, the fourth reference electrode 612, the fifth reference electrode 613, the sixth reference electrode 622, the seventh reference electrode 72 and the eighth reference electrode 21) can all be understood as metal grounds. The material of the reference electrode includes but is not limited to metallic copper.

Figure 10:
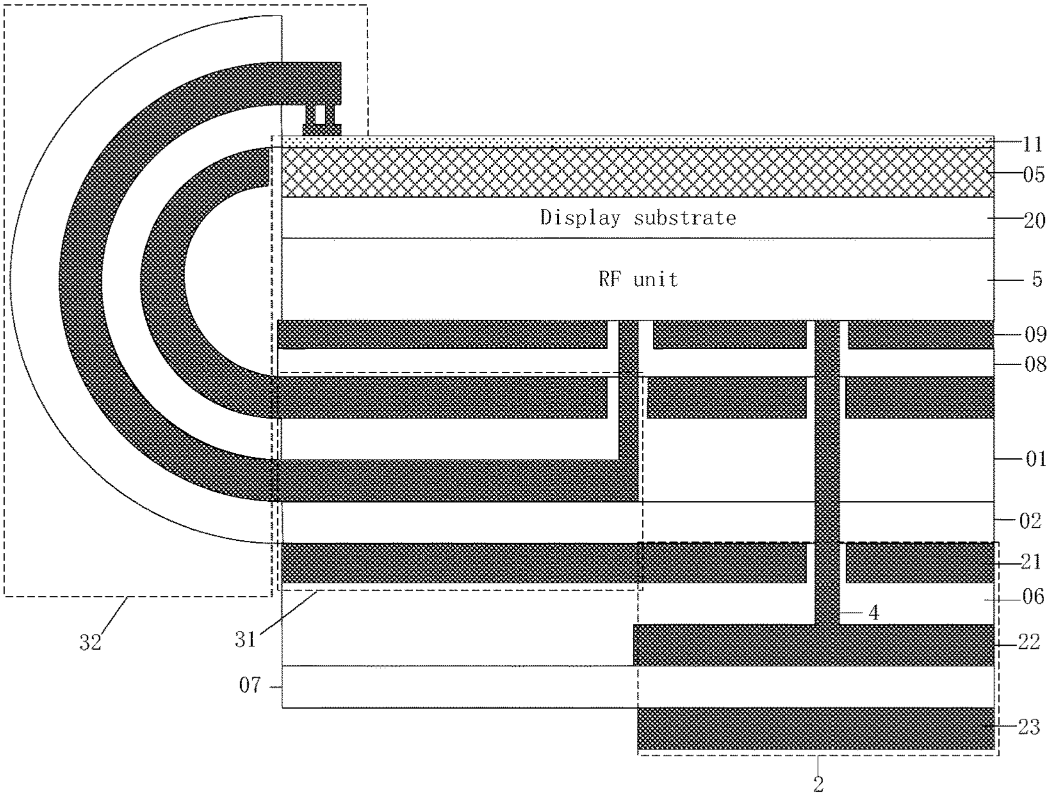
FIG. 10 is a schematic structural diagram of the antenna module shown in FIG. 9*a* applied in a display device.
Figure 11:
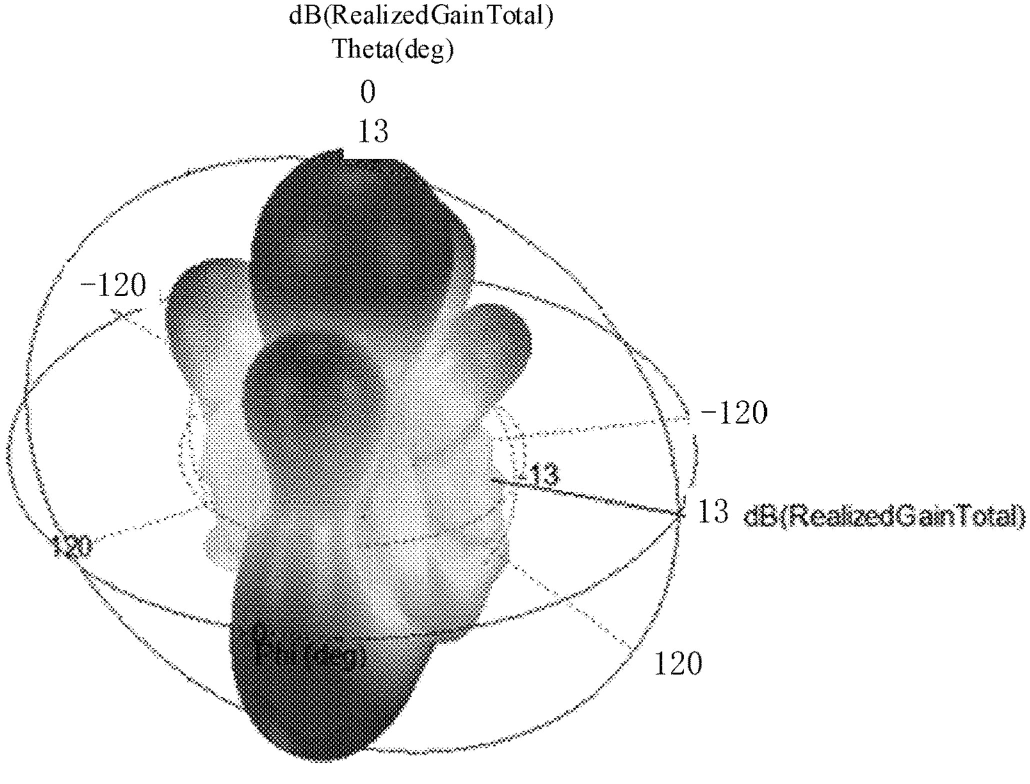
FIG. 11 is a schematic diagram of a three-dimensional direction simulation of an antenna module provided by an embodiment of the present disclosure.
Figure 12:
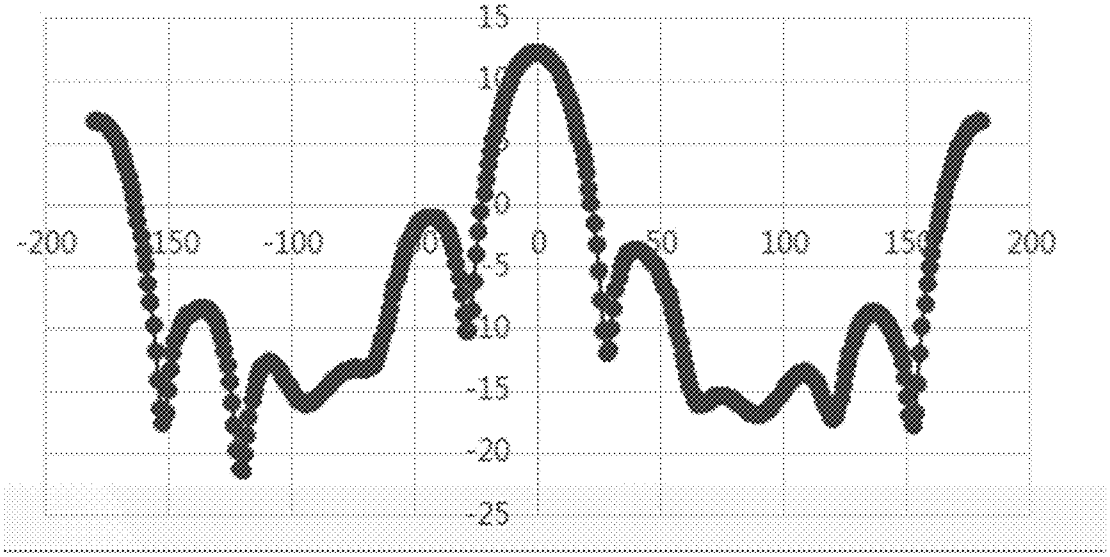
FIG. 12 is a schematic diagram of a two-dimensional direction simulation of an antenna module provided by an embodiment of the present disclosure.
Figure 13:
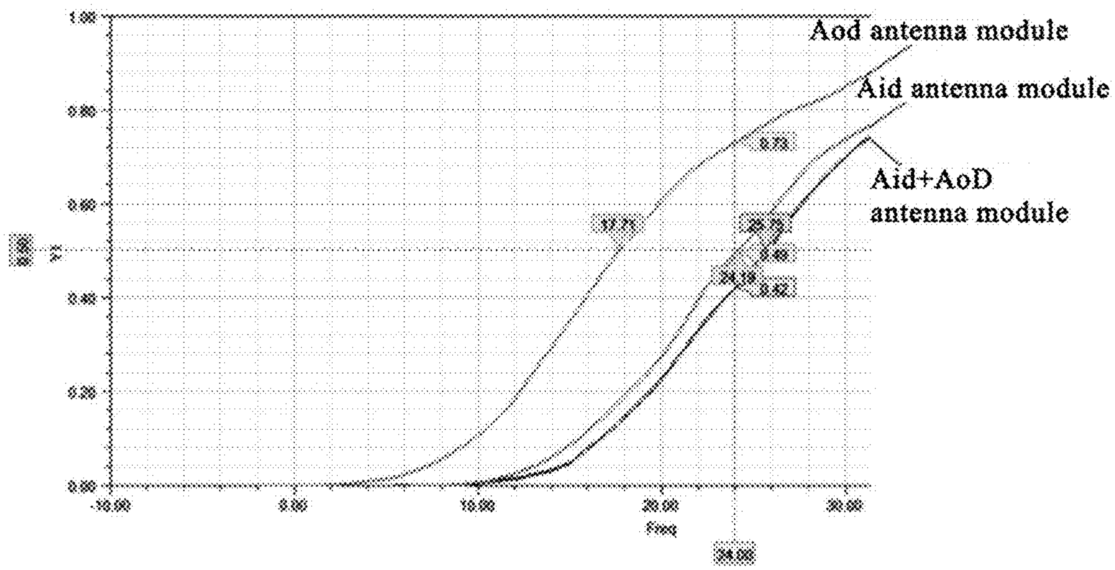
FIG. 13 is a schematic simulation diagram of the cumulative spatial distribution of the antenna module provided by an embodiment of the present disclosure.

FIG. 10 is a schematic structural diagram of the antenna module shown in FIG. 9*a* applied in a display device. FIG. 11 is a three-dimensional direction simulation diagram of the antenna module provided by an embodiment of the present disclosure. FIG. 12 is a two-dimensional direction simulation diagram of the antenna module provided by an embodiment of the present disclosure. FIG. 13 is a simulation schematic diagram of the cumulative spatial distribution of the antenna module provided by an embodiment of the present disclosure. FIG. 10 only shows a simplified model of the antenna. The actual model is more complex than the illustrated model. The antenna module 100 shown in FIG. 10 is simulated and verified, as shown in FIGS. 11, 12 and 13, through simulation, it can be seen that due to the display substrate 20 in the display device 200 itself being impenetrable, the AiP antenna is placed below the display substrate 20, and an AoD antenna is placed above the display substrate 20. There are two radiation main lobes at the top and bottom respectively, which can achieve signal coverage above and below the screen.

It should be noted that cumulative distribution function (CDF) is the probability that a certain variable is less than or equal to the abscissa value (a certain target value), for example: a certain antenna gain Q, CDF=P means that the probability that the antenna gain is less than or equal to Q is P. When using antenna arrays, you may face the problem of reduced beamwidth due to natural array physics, and to overcome this the antenna system must be able to scan at a wide angle, the sum of all possible scan angles of the array can be observed as the total radiation pattern. The ideal situation is to achieve omnidirectional coverage, but in practical applications this is impossible. Considered as an indicator of spherical coverage antenna gain, transmitter power and transmission loss, in the 3rd Generation Partnership Project (3GPP) specification, spherical coverage is determined by the cumulative distribution function (CDF) of the Effective Isotropic Radiated Power (EIRP), which is a combination of transmission power and array gain. General communication requirements require that the antenna gain should be greater than 22 dBm when CDF=0.5 (that is, the millimeter wave spatial coverage effect of the antenna module 100 is 50%). Different frequency bands have different requirements.

In the embodiment of the present disclosure, as shown in FIG. 13, comparing the Cumulative Distribution Function (CDF), the effect of the AiP antenna module is better than that of the AoD antenna module. The effect of the AiP+AoD antenna module 100 is better than AiP antenna module. In the existing comparison model, at 28 GHz frequency, when CDF=0.5, the radiated power value of the AoD antenna module is 17.7 dBm, the radiated power value of the AiP antenna module is 24.19 dBm, and the radiated power value of the AiP+AoD antenna module 100 is 25.75 dBm. From the perspective of spatial coverage, the comprehensive effect of the AiP+AoD antenna module 100 is optimal, mainly because it combines the advantages of the AiP antenna and the AoD antenna.

Figure 14:
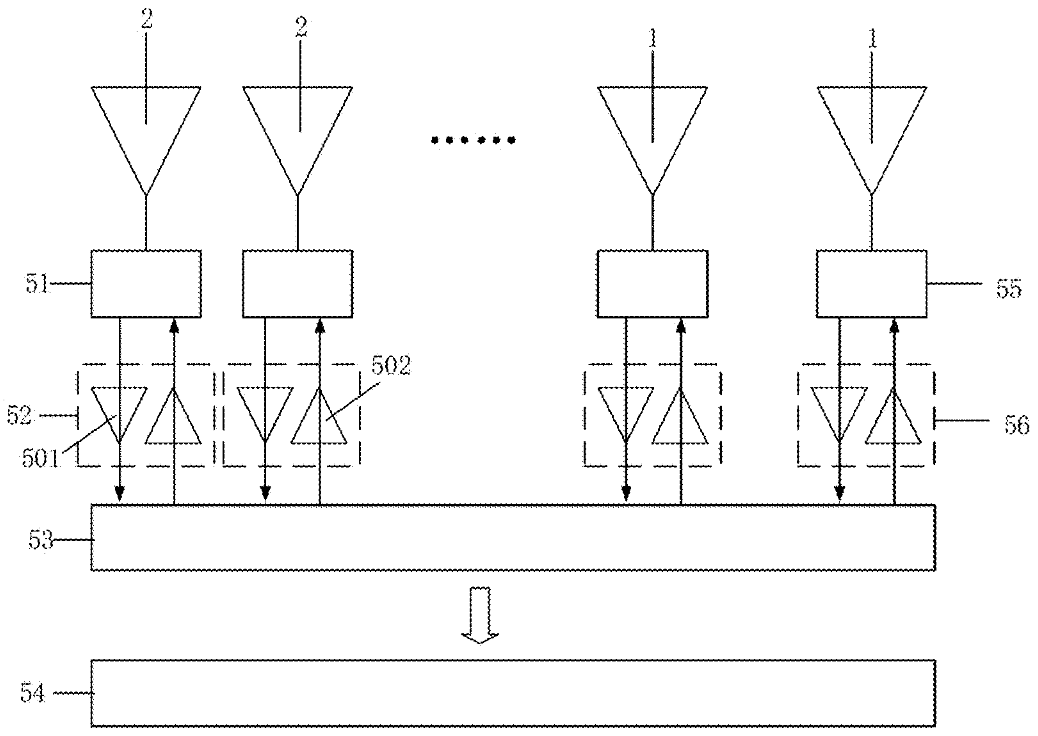
FIG. 14 is a schematic diagram of a connection circuit between an antenna and a radio frequency unit provided by an embodiment of the present disclosure.
Figure 15:
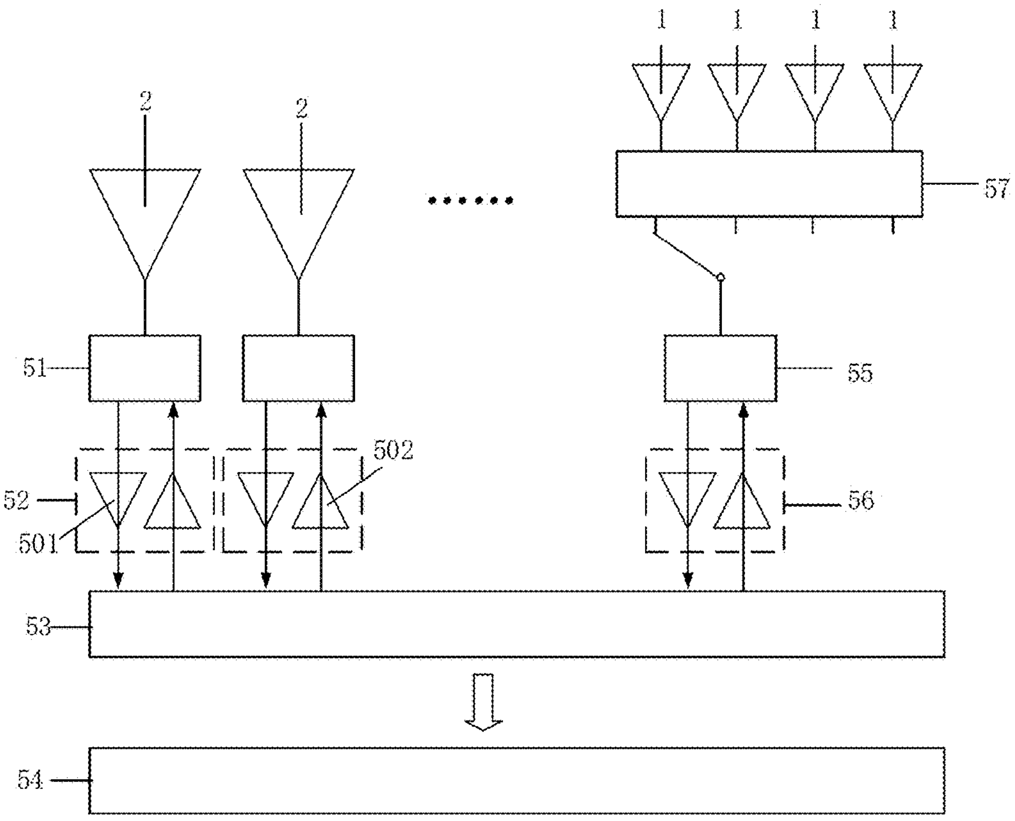
FIG. 15 is another schematic diagram of the connection circuit between the antenna and the radio frequency unit provided by an embodiment of the present disclosure.
Figure 16:
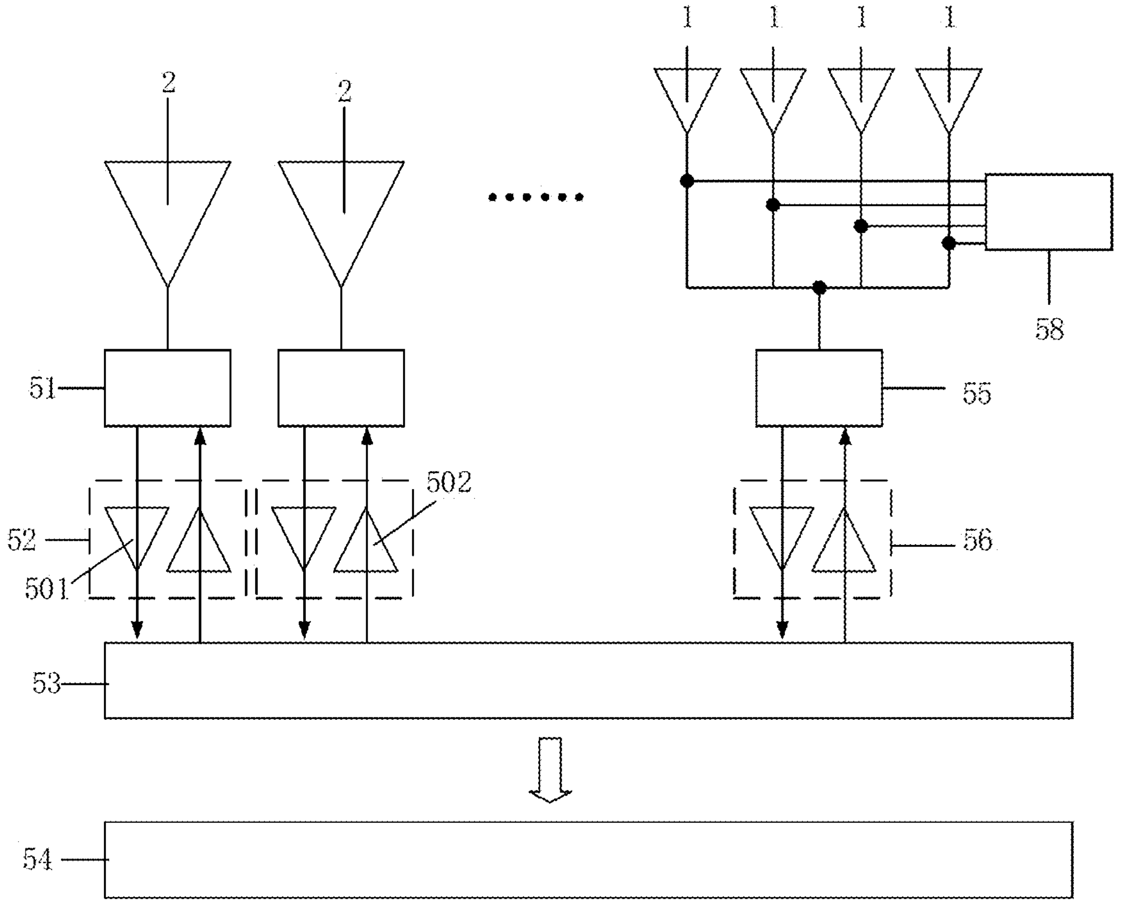
FIG. 16 is another schematic diagram of a connection circuit between an antenna and a radio frequency unit provided by an embodiment of the present disclosure.

The above is a description of the antenna and transmission structure, mainly the passive part of the antenna module 100. Millimeter waves require beam forming and must have an active part, which is the radio frequency unit 5. FIG. 14 is a schematic diagram of a connection circuit between an antenna and a radio frequency unit provided by an embodiment of the present disclosure. FIG. 15 is another schematic diagram of a connection circuit between an antenna and a radio frequency unit provided by an embodiment of the present disclosure. FIG. 16 is another schematic diagram of a connection circuit between an antenna and a radio frequency unit provided by an embodiment of the present disclosure. The connection between the AoD antenna 1 and the AiP antenna 2 and the radio frequency unit 5 will be described in detail below.

First, the connection between the AiP antenna 2 and the radio frequency unit 5 will be described. In some embodiments, as shown in FIG. 14, 15 or 16, the radio frequency unit 5 at least includes a plurality of first multiplexers 51, a plurality of first radio frequency transceiver modules 52, a first phase adjustment module 53 and a baseband 54; the AiP antenna 2 is connected to the first multiplexer 51 in a one-to-one corresponding manner; the first multiplexer 51 is connected to the first radio frequency transceiver module 52 in a one-to-one corresponding manner; the first radio frequency transceiver 52 includes the first signal amplifier 501 located on the receiving path of the antenna module 100, and a second signal amplifier 502 located on the transmission path of the antenna module 100; the first signal amplifier 501 and the second signal amplifier 502 in a first radio frequency transceiver module 52 are connected to different ports of the first multiplexer 51; the first signal amplifier 501 and the second signal amplifier 502 in each first radio frequency transceiver module 52 are both electrically connected to the first phase adjustment module 53; the baseband 54 is electrically connected to the first phase adjustment module 53.

Here, the first multiplexer 51 may select a duplexer, and the first multiplexer 51 is configured to isolate the received signal sent from the AoD antenna 1 and the transmitted signal sent from the second signal amplifier 502 in the first radio frequency transceiver module 52, to ensure that both receiving and transmitting can work normally at the same time. The first radio frequency transceiver module 52 includes a set of first signal amplifier 501 and second signal amplifier 502. The first signal amplifier 501 can be a low noise amplifier (LNA). The LNA is an amplifier with a very low noise coefficient. As a type of operational amplifier, an LNA is configured to amplify signals that may be very weak to reduce losses in the feedline. The second signal amplifier 502 can be a power amplifier (PA). The PA is configured to amplify the weak radio frequency signal on the transmission path, so that the signal successfully obtains high enough power, thereby achieving higher communication quality. The performance of PA can directly determine the stability and strength of communication signals. The first phase adjustment module 53 may be a digital phase shifter, which is configured to perform phase adjustment on the received radio frequency signal to achieve beam forming of millimeter waves. The baseband 54 is configured to process the signal sent from the first phase adjustment module 53 and output it to the outside. When a signal is received from the outside, the baseband 54 is configured to process the signal from the outside and output it to the first phase adjustment module 53.

Further, the first radio frequency transceiver module 52 not only includes the first signal amplifier 501 and the second signal amplifier 502, but may also include other filter, matching, switches, tuners and other devices.

In some embodiments, as shown in FIG. 14, the radio frequency unit 5 also includes a plurality of second multiplexers 55 and a plurality of second radio frequency transceiver modules 56; the AoD antenna 1 is connected to the second multiplexers 55 in a one-to-one corresponding manner; the second multiplexer 55 is connected to the second radio frequency transceiver module 56 in a one-to-one corresponding manner; the second radio frequency transceiver module 56 includes a first signal amplifier 501 located on the receiving path of the antenna module 100, and a second signal amplifier 502 located on the transmitting path of the antenna module 100; the first signal amplifier 501 and the second signal amplifier 502 in a second radio frequency transceiver module 56 are connected to different ports of the second multiplexer 55; the first signal amplifier 501 and the second signal amplifier 502 in each second radio frequency transceiver module 56 are both electrically connected to the first phase adjustment module 53.

Here, the second multiplexer 55 may select a duplexer, and the second multiplexer 55 is configured to isolate the received signal sent from the AiP antenna 2 and the transmitted signal sent from the second signal amplifier 502 in the second radio frequency transceiver module 56 to ensure that both receiving and transmitting can work normally at the same time. The second radio frequency transceiver module 56 includes a set of first signal amplifier 501 and second signal amplifier 502, where the first signal amplifier 501 may select an LNA, which is configured to amplify signals that may be very weak to reduce losses in the feeder. The second signal amplifier 502 may select a PA, which is configured to amplify the weak radio frequency signal on the transmission path, so that the signal successfully obtains high enough power, thereby achieving higher communication quality. The performance of PA can directly determine the stability and strength of communication signals. The second phase adjustment module 57 may select a digital phase shifter, which is configured to perform phase adjustment on the received radio frequency signal to achieve beam forming of millimeter waves. The baseband 54 is configured to process the signal sent from the second phase adjustment module 57 and output it to the outside. When a signal is received from the outside, the baseband 54 is configured to process the signal from the outside and output it to the second phase adjustment module 57.

Further, the second radio frequency transceiver module 56 not only includes the first signal amplifier 501 and the second signal amplifier 502, but may also include other filtering, matching, switches, tuners and other devices.

In some embodiments, as shown in FIG. 15, the radio frequency unit 5 also includes one second multiplexer 55, one second radio frequency transceiver module 56 and a second phase adjustment module 57; each AoD antenna 1 is electrically connected to the second phase adjustment module 57, and different AoD antennas 1 are connected to different first ports of the second phase adjustment module 57; the second port of the second phase adjustment module 57 is electrically connected to the second multiplexer 55; the second multiplexer 55 is electrically connected to the second radio frequency transceiver module 56; the second radio frequency transceiver module 56 includes a first signal amplifier 501 located on the receiving path of the antenna module 100, and a second signal amplifier 502 located on the transmitting path of the antenna module 100; the first signal amplifier 501 and the second signal amplifier 502 in the radio frequency transceiver module 56 are connected to different ports of the second multiplexer 55; the first signal amplifier 501 and the second signal amplifier 502 in the second radio frequency transceiver module 56 are both connected to the first phase adjustment module 53;

It should be noted that the introduction of the second multiplexer 55 and the second radio frequency transceiver module 56 here refers to the above embodiment, and the repeated parts will not be described again.

In this embodiment, the second phase adjustment module 57 may select the Butler matrix. The structure shown in FIG. 14 uses the radio frequency board originally integrated with the AiP antenna 2. After adding the AoD antenna 1, multiple radio frequency components are added to the radio frequency board to form the current radio frequency unit 5. This also means that the cost of the radio frequency unit 5 is multiplied compared to the original radio frequency board (mainly increasing the cost of the second multiplexer 55 and the second phase adjustment module 57). In order to reduce costs, passive beam scanning as shown in FIG. 15 can be used. A Butler matrix is connected to the 1 end of the AoD antenna, such as a 4×4 Butler matrix. Combined with a single-pole four-throw switch, four beam directions can be achieved. Although the beam scanning capability is reduced, compared with the purely active AiP+AoD antenna module 100 shown in FIG. 14, the cost of this embodiment is greatly reduced. In addition, from the above analysis, it can be seen that the transmission line loss of the LCP board is relatively small, and the insertion loss caused by the introduction of the Butler matrix is within an acceptable range. If you want to achieve more beam scanning range, you can adjust the size of the Butler matrix.

In some embodiments, as shown in FIG. 16, the radio frequency unit 5 also includes one second multiplexer 55, one second radio frequency transceiver module 56 and a third phase adjustment module 58; the first port of each AoD antenna 1 is connected to a port of the second multiplexer 55; the first port of each AoD antenna 1 is electrically connected to the third phase adjustment module 58, and different AoD antennas 1 are connected to different ports of the third phase adjustment module 58; the second multiplexer 55 is electrically connected to the second radio frequency transceiver module 56; the second radio frequency transceiver module 56 includes a first signal amplifier 501 located on the receiving path of the antenna module 100, and a second signal amplifier 502 located on the transmitting path of the antenna module 100; the first signal amplifier 501 and the second signal amplifier 502 in the second radio frequency transceiver module 56 are connected to different ports of the second multiplexer 55; the first signal amplifier 501 and the second signal amplifier 502 in the second radio frequency transceiver module 56 are both electrically connected to the first phase adjustment module 53; the baseband 54 processor is configured to provide a second control signal to the second multiplexer 55; provide a fourth control signal to the third phase adjustment module 58; and, process and output the signal sent by the first phase adjustment module 53.

It should be noted that the introduction of the second multiplexer 55 and the second radio frequency transceiver module 56 here refers to the above embodiment, and the repeated parts will not be described again.

In this embodiment, the third phase adjustment module 58 can select a phase shift control circuit, such as a Micro Electro Mechanical Systems (MEMS) phase shifter.

In addition to using the Butler matrix to achieve passive beam scanning, continuous MEMS phase shifters can be used to achieve continuous beam scanning. A certain number of MEMS phase shifters are connected to the 1 end of the AoD antenna, and through the control circuit, the AoD antenna 1 can be phase-shifted to achieve beam scanning.

Figure 17:
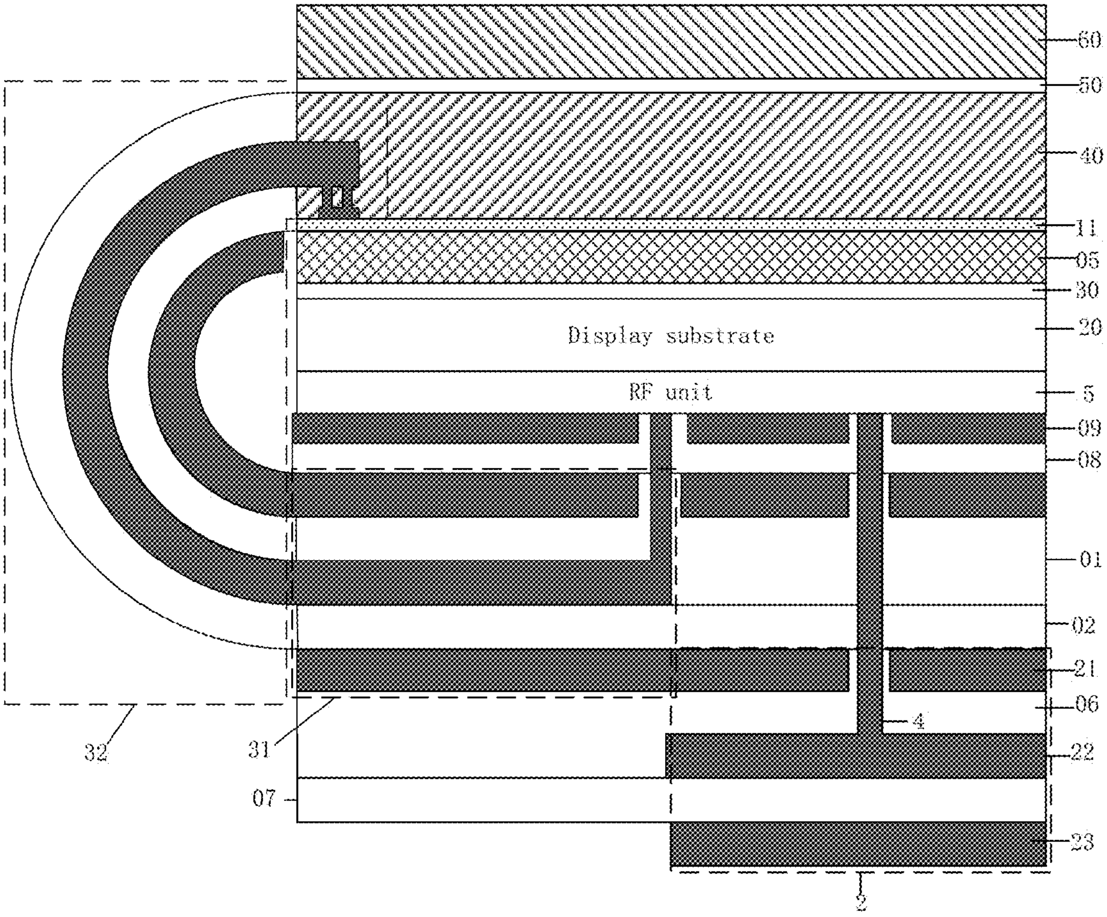
FIG. 17 is a schematic structural diagram of a display device provided by an embodiment of the present disclosure.

In addition, the present disclosure also provides a display device 200, which includes a display module and the antenna module 100 as in any one of the above embodiments. FIG. 17 is a schematic structural diagram of a display device provided by an embodiment of the present disclosure. As shown in FIG. 17, the display module at least includes a display substrate 20; the AiP antenna 2 is arranged on the light emitting side of the display substrate 20, and the radio frequency unit 5 is arranged on a side of the display substrate 20 away from the AiP antenna 2, the AiP antenna 2 is arranged on the side of the radio frequency unit 5 away from the display substrate 20.

In some embodiments, the first transmission structure 3 is integrated with the AiP antenna 2 and bonded with the radio frequency unit 5. Specifically, the antenna module also includes an eighth dielectric layer 08 and a bonding layer 09; the bonding layer 09 is bonded to the radio frequency unit 5, thereby integrating the radio frequency unit 5 with the first transmission structure 3 and the AiP antenna 2.

Exemplarily, the AOD antenna 1 and the AiP antenna 2 can have many different layouts. FIG. 18*a* is a schematic diagram of the layout of the AoD antenna and the AiP antenna on a display substrate provided by an embodiment of the present disclosure. FIG. 18*b* is another schematic diagram of the layout of the AoD antenna and an AiP antenna on a display substrate provided by an embodiment of the present disclosure. FIG. 18*c* is another schematic diagram of the layout of the AoD antenna and an AiP antenna on a display substrate provided by an embodiment of the present disclosure; as shown in FIG. 18*a*, the display substrate 20 includes two AiP antennas 2; the display substrate 20 includes a first side and a second side that are oppositely arranged along the first direction Y, and the AoD antenna 1 and one AiP antenna 2 are located on a side of the display substrate 20 close to the first side, and the orthographic projections of the AoD antenna 1 and the AiP antenna 2 on the display substrate 20 at least overlap, thereby improving the integration accuracy of the antenna module 100 and reducing the space occupied by the antenna module 100. Here, the antenna module 100 applied in the display device 200 can select the antenna module 100 shown in FIG. 9*a*, and the first transmission structure 3 integrated on the AoD antenna 1 board is used to realize the integration of the AoD antenna 1 and the AiP antenna 2, at the same time, the AoD antenna 1 is directly electrically connected to the radio frequency unit 5 through the first transmission structure 3. The shorter first transmission structure 3 can reduce the loss of the AoD antenna 1 during the signal transmission process. Another AiP antenna 2 can be installed on the side adjacent to the first side (that is, the third side described below). The two AiP antennas 2 and one AoD antenna 1 work together to achieve omnidirectional millimeter wave coverage. Moreover, each antenna shares a radio frequency unit 5, which improves the integration level of the antenna module.

As shown in FIG. 18*b* and FIG. 18*c*, the display device 200 also includes a third side and a fourth side arranged oppositely along the second direction X. The first direction X is perpendicular to the second direction Y; the AoD antenna 1 is located on a side of the display device 200 close to the first side, one AiP antenna 2 is located on the side of the display device 200 close to the third side, and another AiP antenna 2 is located on the side of the display device 200 close to the fourth side, and the orthographic projections of the AoD antenna 1 and the AiP antenna 2 on the display substrate 20 do not overlap. It should be noted that the first direction Y is perpendicular to the second direction X. According to the viewing angle shown in FIG. 17, the first direction Y and the second direction Y may be parallel to two adjacent sides of the display device 200, for example, the first direction may be the length direction of the display device 200, and the second direction X may be the width direction of the display device 200.

Here, the antenna module 100 applied in the display device 200 can select the antenna module 100 shown in FIG. 9*b* or FIG. 9*c*, because the AoD antenna 1 and the AiP antenna 2 are respectively located on different sides of the display substrate 20 that are vertically arranged, when the AoD antenna 1 and the AiP antenna 2 share the same radio frequency unit 5, the AoD antenna 1 can use the third transmission structure 6 located on the light-emitting surface side of the display substrate 20 as a transfer board, and then be electrically connected to the first transmission structure 3, Then, it is connected to the radio frequency unit 5 through the bended first transmission structure 3. The AoD antenna 1 and AiP antenna 2 are respectively located on different sides of the display substrate 20 that are vertically arranged, which can improve the spatial coverage of millimeter waves. Of course, not only the layout example of AoD antenna 1 and AiP antenna 2 in FIG. 18*b*, in order to improve the spatial coverage of millimeter waves, AoD antenna 1 and AiP antenna 2 can also adopt other layout methods. If AoD antenna 1 and AiP antenna 2 are arranged along the horizontal direction, if the horizontal distance is relatively long, the antenna module 100 shown in FIG. 9*b* or FIG. 9*c* can be used, and the third transmission structure 6 or the fourth transmission structure 7 can be used to realize the transfer.

In some embodiments, as shown in FIG. 17, the display module also includes a first bonding structure 30 arranged on the side of the AiP antenna 2 close to the display substrate 20, and a polarizer 40 arranged on the side of the AiP antenna 2 away from the display substrate 20, the second bonding structure 50 arranged on the side of the polarizer 40 away from the AoD antenna 1, and the cover plate 60 arranged on the side of the second bonding structure 50 away from the polarizer 40.

Exemplarily, the radio frequency unit 5 is located between the AiP antenna 2 and the display substrate 20. The display substrate 20 at least includes a pixel driving circuit and a light-emitting device. The display substrate 20 may be, for example, an organic light-emitting semiconductor (OLED) substrate, referred to as an OLED substrate. The OLED substrate can serve as the metal ground of the radio frequency unit 5.

Here, the first bonding structure 30 and the second bonding structure 50 may be optical glue (Optically Clear Adhesive, OCA).

For the antenna module shown in FIG. 9*a*, the preparation process is: first, bonding the radio frequency unit 5 to the AiP antenna 2 and the AoD antenna 1; then performing the module bonding, and the display substrate 20 is first bonded to the first bonding structure 30, then bonded to the AoD antenna 1, then bonded to the polarizer 40, then bonded to the second bonding structure 50, and then bonded to the cover plate 60.

For the antenna module shown in FIG. 9*a*, the preparation process is as follows: first, bonding the radio frequency unit 5 to the AiP antenna 2, the first transmission structure 3, the second transmission structure 4 and the AoD antenna 1; then performing the module bond, the display substrate 20 is first bonded to the first bonding structure 30, then bonded to the AoD antenna 1, then bonded to the polarizer 40, then bonded to the second bonding structure 50, and then bonded to the cover plate 60. Compared with the method of setting up a transfer structure, the antenna module shown in FIG. 9*a* has relatively low loss.

For the antenna module shown in FIG. 9*b*, the preparation process is as follows: first, bonding the radio frequency unit 5 to the AiP antenna 2, the first transmission structure 3 and the second transmission structure 4; and the bonding the AoD antenna 1 to the third transmission structure 6; in addition, performing the module bond. Specifically, the display substrate 20 is first bonded to the first bonding structure 30, then bonded to the AoD antenna 1, then bonded to the polarizer 40, and then bonded to the second bonding structure 50, and then bonded to the cover plate 60; finally, the third transmission structure 6 and the first transmission structure 3 are bonded and connected. Since the antenna module shown in FIG. 9*a* first bonds the radio frequency unit 5 to the AiP antenna 2, the first transmission structure 3, the second transmission structure 4 and the AoD antenna 1, the radio frequency unit 5 occupies a certain volume and has a certain weight, during the process of bonding to the polarizer 40 or the cover plate 60, it may easily cause transportation problems. As for the antenna module shown in FIG. 9*b*, due to setting a transfer structure (the third transmission structure 6), the third transmission structure 6 and the first transmission structure 3 can finally be bonded and connected, which can accordingly improve the product yield.

For the antenna module shown in FIG. 9*c*, the preparation process is: first, bonding the radio frequency unit 5 to the AiP antenna 2, the first transmission structure 3 and the second transmission structure 4; in addition, performing the module bond, specifically, the display substrate 20 is first bonded to the first bonding structure 30, and then bonded to the AoD antenna 1 and the fourth transmission structure 7 (the AoD antenna 1 and the fourth transmission structure 7 are an integrated structure), and then bonded to the polarizer 40, and then bonded to the second bonding structure 50, and then bonded to the cover plate 60; finally, the fourth transmission structure 7 and the first transmission structure 3 are bonded and connected. Since the antenna module shown in FIG. 9*a* first bonds the radio frequency unit 5 to the AiP antenna 2, the first transmission structure 3, the second transmission structure 4 and the AoD antenna 1, the radio frequency unit 5 occupies a certain volume and has a certain weight, during the process of bonding the polarizer 40 or the cover plate 60, it may easily cause transportation problems. As for the antenna module shown in FIG. 9*c*, due to setting a transfer structure (the fourth transmission structure 7), the fourth transmission structure 7 and the first transmission structure 3 can finally be bonded and connected, which can accordingly improve the product yield. At the same time, the AoD antenna 1 and the fourth transmission structure 7 are integrated structures, which further improves the efficiency of the product preparation process.

For example, the display device 200 can be any product with a display function, such as a mobile phone, a tablet computer, a television, a monitor, a notebook computer, a digital photo frame, a vehicle-mounted device, or the like. Other essential components of the display device 200 are understood by those of ordinary skill in the art, and will not be described in detail here, nor should they be used to limit the present disclosure.

It can be understood that the above embodiments are only exemplary embodiments adopted to illustrate the principles of the present disclosure, but the present disclosure is not limited thereto. For those of ordinary skill in the art, various modifications and improvements can be made without departing from the spirit and essence of the disclosure, and these modifications and improvements are also regarded as the protection scope of the disclosure.

What is claimed is:

1. An antenna module; wherein the antenna module includes a first antenna, a first transmission structure, a second antenna, a second transmission structure, and a radio frequency unit; the first antenna is electrically connected to the radio frequency unit at least through the first transmission structure, and the second antenna is electrically connected to the radio frequency unit through the second transmission structure;

wherein the antenna module further includes a first dielectric layer and a second dielectric layer; the first transmission structure includes a first transmission line and a second transmission line;

the first transmission line includes a first signal electrode, a first reference electrode and a second reference electrode; the first signal electrode is provided between the first dielectric layer and the second dielectric layer; the first reference electrode is arranged on a side of the first dielectric layer away from the first signal electrode; the second reference electrode is arranged on a side of the second dielectric layer away from the first signal electrode, the first reference electrode and the second reference electrode define the first signal electrode therebetween, and the first signal electrode is electrically connected to the radio frequency unit;

the second transmission line includes a second signal electrode and a third reference electrode, one of the second signal electrode and the third reference electrode is arranged between the first dielectric layer and the second dielectric layer, and the other is arranged on a side of the first dielectric layer away from the second dielectric layer; orthographic projections of the second signal electrode and the third reference electrode on the first dielectric layer at least partially overlap; the second signal electrode is electrically connected to the first antenna; the first signal electrode is electrically connected to the second signal electrode.

2. The antenna module according to claim 1, wherein when the second signal electrode is arranged between the first dielectric layer and the second dielectric layer, the second signal electrode is bonded to the first antenna through a first via hole penetrating the first dielectric layer.

3. The antenna module according to claim 1, wherein when the third reference electrode is arranged on a side of the first dielectric layer away from the second signal electrode, the third reference electrode and the first reference electrode are integrally formed; when the third reference electrode is arranged on a side of the second dielectric layer away from the second signal electrode, the third reference electrode and the second reference electrode are integrally formed.

4. The antenna module according to claim 1, wherein the antenna module further includes a third transmission structure, the third transmission structure is electrically connected to the first transmission structure;

the first antenna is electrically connected to the radio frequency unit through the first transmission structure and the third transmission structure.

5. The antenna module according to claim 4, wherein the antenna module further includes a third dielectric layer and a fourth dielectric layer;

the third transmission structure includes a third transmission line and a fourth transmission line;

the third transmission line includes a third signal electrode, a fourth reference electrode and a fifth reference electrode; the third signal electrode is provided between the third dielectric layer and the fourth dielectric layer; the fourth reference electrode is arranged on a side of the third dielectric layer away from the third signal electrode; the fifth reference electrode is arranged on a side of the fourth dielectric layer away from the second signal electrode, the fourth reference electrode and the fifth reference electrode define the second signal electrode therebetween, and the third signal electrode is electrically connected to the second signal electrode;

the fourth transmission line includes a fourth signal electrode and a sixth reference electrode, and the fourth signal electrode is arranged on a side of the third dielectric layer close to the fourth dielectric layer; the sixth reference electrode is arranged on a side of the third dielectric layer away from the fourth signal electrode; orthographic projections of the fourth signal electrode and the sixth reference electrode on the fourth dielectric layer at least partially overlap; the fourth signal electrode is electrically connected to the third signal electrode; the sixth reference electrode and the fourth reference electrode are electrically connected.

6. The antenna module according to claim 5, wherein when the second signal electrode is arranged between the first dielectric layer and the second dielectric layer, the second signal electrode is bonded to the third signal electrode through a first via hole penetrating the first dielectric layer and a second via hole penetrating the fourth dielectric layer.

7. The antenna module according to claim 5, wherein the fourth signal electrode is bonded to the first antenna through a third via hole penetrating the fourth dielectric layer.

8. The antenna module according to claim 1, wherein the antenna module further includes a fourth transmission structure, the fourth transmission structure is electrically connected to the first transmission structure;

the first antenna is electrically connected to the radio frequency unit through the first transmission structure and the fourth transmission structure.

9. The antenna module according to claim 8, wherein the antenna module further includes a fifth dielectric layer, the fifth dielectric layer includes a first surface and a second surface arranged oppositely along a thickness direction of the fifth dielectric layer; the first antenna includes a first radiation patch arranged on the first surface of the fifth dielectric layer;

the fourth transmission structure includes a fifth signal electrode and a seventh reference electrode; the fifth signal electrode is arranged on the first surface of the fifth dielectric layer, and the seventh reference electrode is arranged on the second surface of the fifth dielectric layer, and orthographic projections of the fifth signal electrode and the seventh reference electrode on the fifth dielectric layer at least partially overlap; the fifth signal electrode and the first radiation patch are electrically connected; the fifth signal electrode and the second signal electrode are electrically connected.

10. The antenna module according to claim 9, wherein when the second signal electrode is arranged between the first dielectric layer and the second dielectric layer, the second signal electrode is bonded to the fifth signal electrode through the first via hole penetrating the first dielectric layer.

11. The antenna module according to claim 1, wherein the antenna module further includes a sixth dielectric layer and a seventh dielectric layer;

the second antenna includes an eighth reference electrode, a second radiation patch and a third radiation patch; the eighth reference electrode is arranged between the second dielectric layer and the sixth dielectric layer; the second radiation patch is arranged between the sixth dielectric layer and the seventh dielectric layer; the third radiation patch is arranged on a side of the seventh dielectric layer away from the second radiation patch; orthographic projections of the eighth reference electrode, the second radiation patch and the third radiation patch on the second dielectric layer at least partially overlap; the second radiation patch and the second transmission structure are electrically connected.

12. The antenna module according to claim 11, wherein the eighth reference electrode and the second reference electrode are integrally formed.

13. The antenna module according to claim 11, wherein a material of the first dielectric layer, the sixth dielectric layer and the seventh dielectric layer is a polymer liquid crystal polymer.

14. The antenna module according to claim 1, wherein the radio frequency unit at least includes a plurality of first multiplexers, a plurality of first radio frequency transceiver modules, a first phase adjustment module and a baseband;

the second antenna is connected to each of the plurality of first multiplexers in a one-to-one corresponding manner;

each of the plurality of first multiplexers is connected to each of the plurality of first radio frequency transceiver modules in a one-to-one corresponding manner; each of the plurality of first radio frequency transceiver modules includes a first signal amplifier located on a receiving path of the antenna module, and a second signal amplifier located on a transmitting path of the antenna module; the first signal amplifier and the second signal amplifier in one first radio frequency transceiver module are connected to different ports of each of the plurality of first multiplexers;

the first signal amplifier and the second signal amplifier in each of the plurality of first radio frequency transceiver modules are both electrically connected to the first phase adjustment module;

the baseband is electrically connected to the first phase adjustment module.

15. The antenna module according to claim 14, wherein the radio frequency unit further includes a plurality of second multiplexers and a plurality of second radio frequency transceiver modules;

the first antenna is connected to each of the plurality of second multiplexers in a one-to-one corresponding manner;

each of the plurality of second multiplexers is connected to each of the plurality of second radio frequency transceiver modules in a one-to-one corresponding manner; each of the plurality of second radio frequency transceiver modules includes a first signal amplifier located on a receiving path of the antenna module, and a second signal amplifier located on a transmitting path of the antenna module; the first signal amplifier and the second signal amplifier in one second radio frequency transceiver module are connected to different ports of each of the plurality of second multiplexers;

the first signal amplifier and the second signal amplifier in each of the plurality of second radio frequency transceiver modules are both electrically connected to the first phase adjustment module.

16. The antenna module according to claim 14, wherein the radio frequency unit further includes one second multiplexer, one second radio frequency transceiver module and a second phase adjustment module;

each first antenna of the at least one first antennas is electrically connected to the second phase adjustment module, and different first antennas of the at least one first antenna are connected to different first ports of the second phase adjustment module;

a second port of the second phase adjustment module is electrically connected to the second multiplexer;

the second multiplexer is electrically connected to the second radio frequency transceiver module; the second radio frequency transceiver module includes a first signal amplifier located on a receiving path of the antenna module, and a second signal amplifier located on a transmitting path of the antenna module; the first signal amplifier and the second signal amplifier in the second radio frequency transceiver module are connected to different ports of the second multiplexer;

the first signal amplifier and the second signal amplifier in the second radio frequency transceiver module are both connected to the first phase adjustment module.

17. The antenna module according to claim 14, wherein the radio frequency unit further includes one second multiplexer, one second radio frequency transceiver module and a third phase adjustment module;

a first port of each first antenna of the at least one first antenna is connected to a port of the second multiplexer;

the first port of each first antenna of the at least one first antenna is electrically connected to the third phase adjustment module, and different first antennas of the at least one first antenna are connected to different ports of the third phase adjustment module;

the second multiplexer is electrically connected to the second radio frequency transceiver module; the second radio frequency transceiver module includes a first signal amplifier located on a receiving path of the antenna module, and a second signal amplifier located on a transmitting path of the antenna module; the first signal amplifier and the second signal amplifier in the second radio frequency transceiver module are connected to different ports of the second multiplexer;

the first signal amplifier and the second signal amplifier in the second radio frequency transceiver module are both electrically connected to the first phase adjustment module.

18. A display device, comprising a display module and an antenna module;

wherein the antenna module includes a first antenna, a first transmission structure, a second antenna, a second transmission structure, and a radio frequency unit; the first antenna is electrically connected to the radio frequency unit at least through the first transmission structure, and the second antenna is electrically connected to the radio frequency unit through the second transmission structure;

wherein the antenna module further includes a first dielectric layer and a second dielectric layer; the first transmission structure includes a first transmission line and a second transmission line;

the first transmission line includes a first signal electrode, a first reference electrode and a second reference electrode; the first signal electrode is provided between the first dielectric layer and the second dielectric layer; the first reference electrode is arranged on a side of the first dielectric layer away from the first signal electrode; the second reference electrode is arranged on a side of the second dielectric layer away from the first signal electrode, the first reference electrode and the second reference electrode define the first signal electrode therebetween, and the first signal electrode is electrically connected to the radio frequency unit;

the second transmission line includes a second signal electrode and a third reference electrode, one of the second signal electrode and the third reference electrode is arranged between the first dielectric layer and the second dielectric layer, and the other is arranged on a side of the first dielectric layer away from the second dielectric layer; orthographic projections of the second signal electrode and the third reference electrode on the first dielectric layer at least partially overlap; the second signal electrode is electrically connected to the first antenna; the first signal electrode is electrically connected to the second signal electrode, wherein the display module at least includes a display substrate; the second antenna is arranged on a light-emitting side of the display substrate; the radio frequency unit is arranged on a side of the display substrate away from the second antenna; the second antenna is arranged on a side of the radio frequency unit away from the display substrate;

wherein when the antenna module is applied in the display device, the first antenna is located on a display surface side of the display device, and the second antenna is located on a side of the display device away from the display surface side;

wherein the antenna module further includes a third transmission structure, a third dielectric layer and a fourth dielectric layer; when the antenna module is applied in the display device, the third transmission structure, the third dielectric layer and the fourth dielectric layer are all arranged on the display surface side of the display device.

19. The antenna module according to claim 2 wherein when the third reference electrode is arranged on a side of the first dielectric layer away from the second signal electrode, the third reference electrode and the first reference electrode are integrally formed; when the third reference electrode is arranged on a side of the second dielectric layer away from the second signal electrode, the third reference electrode and the second reference electrode are integrally formed.

* * * * *